(12) United States Patent
Huangfu et al.

(10) Patent No.: US 12,554,656 B2
(45) Date of Patent: Feb. 17, 2026

(54) SYSTEMS, METHODS, AND DEVICES FOR NEAR DATA PROCESSING

(71) Applicant: Samsung Electronics Co., Ltd., Suwon-si (KR)

(72) Inventors: Wenqin Huangfu, Goleta, CA (US); Krishna T. Malladi, San Jose, CA (US); Dongyan Jiang, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/214,778

(22) Filed: Mar. 26, 2021

(65) Prior Publication Data

US 2021/0349837 A1 Nov. 11, 2021

Related U.S. Application Data

(60) Provisional application No. 63/021,675, filed on May 7, 2020.

(51) Int. Cl.
*G06F 12/14* (2006.01)
*G06F 9/50* (2006.01)
(Continued)

(52) U.S. Cl.
CPC ........ *G06F 12/1433* (2013.01); *G06F 9/5016* (2013.01); *G06F 13/1673* (2013.01); *G06F 13/4234* (2013.01); *G06F 2209/508* (2013.01)

(58) Field of Classification Search
CPC . G06F 12/1433; G06F 9/5016; G06F 13/1673
(Continued)

(56) References Cited

U.S. PATENT DOCUMENTS

| 9,703,925 | B1 | 7/2017 | Aerni et al. |
| 10,185,499 | B1 * | 1/2019 | Wang ............... G06F 3/0659 |

(Continued)

FOREIGN PATENT DOCUMENTS

| EP | 3396533 A2 | 10/2018 |
| TW | 201937374 A | 9/2019 |
| WO | 2019114979 A1 | 6/2019 |

OTHER PUBLICATIONS

US 10,853,278 B2, 12/2020, Kim et al. (withdrawn)
(Continued)

*Primary Examiner* — Ryan Bertram
*Assistant Examiner* — Sidney Li
(74) *Attorney, Agent, or Firm* — Renaissance IP Law Group LLP

(57) ABSTRACT

A memory module may include one or more memory devices, and a near-memory computing module coupled to the one or more memory devices, the near-memory computing module including one or more processing elements configured to process data from the one or more memory devices, and a memory controller configured to coordinate access of the one or more memory devices from a host and the one or more processing elements. A method of processing a dataset may include distributing a first portion of the dataset to a first memory module, distributing a second portion of the dataset to a second memory module, constructing a first local data structure at the first memory module based on the first portion of the dataset, constructing a second local data structure at the second memory module based on the second portion of the dataset, and merging the first and second local data structures.

19 Claims, 18 Drawing Sheets

(51) Int. Cl.
　　　*G06F 13/16*　　　(2006.01)
　　　*G06F 13/42*　　　(2006.01)
(58) Field of Classification Search
　　　USPC ..................................................... 711/163
　　　See application file for complete search history.

(56) References Cited

U.S. PATENT DOCUMENTS

| | | | |
|---|---|---|---|
| 10,303,662 B1* | 5/2019 | Menezes | G06F 11/1464 |
| 10,678,717 B2 | 6/2020 | Li et al. | |
| 10,776,308 B2 | 9/2020 | Ong et al. | |
| 10,846,233 B2 | 11/2020 | Kang et al. | |
| 10,884,672 B2 | 1/2021 | Song et al. | |
| 10,915,470 B2 | 2/2021 | Kim et al. | |
| 2004/0078544 A1* | 4/2004 | Lee | G06F 12/0215 |
| | | | 711/E12.004 |
| 2004/0153447 A1* | 8/2004 | Hiratsuka | G06F 16/338 |
| 2008/0005516 A1* | 1/2008 | Meinschein | G06F 1/3275 |
| | | | 711/E12.006 |
| 2009/0228684 A1* | 9/2009 | Ramesh | G06F 15/16 |
| | | | 712/E9.002 |
| 2013/0138923 A1* | 5/2013 | Barber | G06F 9/3851 |
| | | | 712/203 |
| 2014/0195725 A1* | 7/2014 | Bennett | G06F 12/0246 |
| | | | 711/103 |
| 2016/0132640 A1* | 5/2016 | Layer | G16B 20/20 |
| | | | 706/12 |
| 2016/0299874 A1* | 10/2016 | Liao | G06F 17/16 |
| 2018/0081583 A1 | 3/2018 | Breternitz et al. | |
| 2018/0122434 A1* | 5/2018 | Lee | G11C 5/04 |
| 2018/0253254 A1* | 9/2018 | Jain | G06F 3/0673 |
| 2019/0171566 A1* | 6/2019 | Jung | G06F 12/10 |
| 2019/0212918 A1 | 7/2019 | Wang et al. | |
| 2019/0266159 A1 | 8/2019 | Chainani et al. | |
| 2019/0384845 A1* | 12/2019 | Saxena | G06F 16/24545 |
| 2020/0341775 A1 | 10/2020 | Mathew et al. | |

OTHER PUBLICATIONS

Farmahini-Farahani, Amin, et al., "NDA: Near-DRAM Acceleration Architecture Leveraging Commodity DRAM Devices and Standard Memory Modules," 2015 IEEE 21st International Symposium on High Performance Computer Architecture (HPCA), Feb. 2015, pp. 283-295.

Huangfu, Wenqin, et al., "MEDAL: Scalable DIMM based Near Data Processing Accelerator for DNA Seeding Algorithm," MICRO '19: Proceedings of the 52nd Annual IEEE, Acm International Symposium on Microarchitecture, Oct. 2019, pp. 587-599.

Bloom, Burton H., "Space/time trade-offs in hash coding with allowable errors", Communications of the ACM, vol. 13, Issue 7, pp. 422-426, Jul. 1970.

Bose, Simmi M. et al., "k-Core: Hardware Accelerator for k-Mer Generation and Counting used in Computational Genomics", 2019 32nd International Conference on VLSI Design and 2019 18th International Conference on Embedded Systems (VLSID), IEEE, Jan. 5-9, 2019.

Cadenelli, Nicola et al., "Considerations in using OpenCL on GPUs and FPGAs for throughput-oriented genomics workloads", Future Generation Computer Systems, vol. 94, May 2019, pp. 148-159.

Chandrasekar, Karthik et al., "DRAMPower: Open-source DRAM Power & Energy Estimation Tool", 2012, URL: http://www.drampower.info.

Chikhi, Rayan et al., "Space-efficient and exact de Bruijn graph representation based on a Bloom filter", Algorithms for Molecular Biology, vol. 8, Article No. 22, Sep. 16, 2013.

Cong, Jason et al., "AIM: accelerating computational genomics through scalable and noninvasive accelerator-interposed memory", MEMSYS '17: Proceedings of the International Symposium on Memory Systems, Oct. 2017, pp. 3-14.

Deorowicz, Sebastian et al., "KMC 2: fast and resource-frugal k-mer counting", Bioinformatics, vol. 31, Issue 10, May 2015, pp. 1569-1576.

Erbert, Marius et al., "Gerbil: a fast and memory-efficient k-mer counter with GPU-support", Algorithms for Molecular Biology 12, Article No. 9 (2017).

Guan, Wei-jie et al., "Clinical Characteristics of Coronavirus Disease 2019 in China", New England Journal of Medicine, Apr. 30, 2020.

Joardar, Biresh Kumar et al., "NoC-enabled software/hardware co-design framework for accelerating k-mer counting", NOCS '19: Proceedings of the 13th IEEE/ACM International Symposium on Networks-on-Chip, Oct. 2019, Article No. 4, pp. 1-8.

Jouppi, Norman P. et al., "CACTI-IO: CACTI With OFF-Chip Power-Area-Timing Models", IEEE Transactions on Very Large Scale Integration (VLSI) Systems, vol. 23, No. 7, pp. 1254-1267, Jul. 2015.

Kim, Yoongu et al., "Ramulator: A Fast and Extensible DRAM Simulator", IEEE Computer Architecture Letters, vol. 15, Issue: 1, Jan.-Jun. 2016, pp. 45-49.

Lu, Roujian et al., "Genomic characterisation and epidemiology of 2019 novel coronavirus: implications for virus origins and receptor binding", The Lancet, Feb. 22-28, 2020, 395(10224), pp. 565-574.

Mcvicar, Nathaniel et al., "K-Mer Counting Using Bloom Filters with an FPGA-Attached HMC", 2017 IEEE 25th Annual International Symposium on Field-Programmable Custom Computing Machines (FCCM), Napa, CA, USA, 2017, pp. 203-210.

Melsted, Pall et al., "Efficient counting of k-mers in DNA sequences using a bloom filter", BMC bioinformatics 12, Article 333, 2011.

Merker, Jason D. et al., "Long-read genome sequencing identifies causal structural variation in a Mendelian disease", Genetics in Medicine 20, 1 (2018), 159-163.

Pan, Tony C. et al., "Optimizing High Performance Distributed Memory Parallel Hash Tables for DNA k-mer Counting", SC18: International Conference for High Performance Computing, Networking, Storage and Analysis, Dallas, TX, USA, 2018, pp. 135-147.

Pugsley, Seth H. et al., "Comparing Implementations of Near-Data Computing with In-Memory MapReduce Workloads", IEEE Micro, vol. 34, No. 4, pp. 44-52, Jul.-Aug. 2014.

Ramachandran, Anand et al., "FPGA accelerated DNA error correction", 2015 Design, Automation & Test in Europe Conference & Exhibition (Date), Grenoble, France, 2015, pp. 1371-1376.

Shendure, Jay et al., "Next-generation DNA sequencing", Nature biotechnology 26, pp. 1135-1145, 2008.

SYNOPSYS 2018. Design Complier. https://www.synopsys.com/support/training/rtl-synthesis/design-compiler-rtl-synthesis.html.

\* cited by examiner

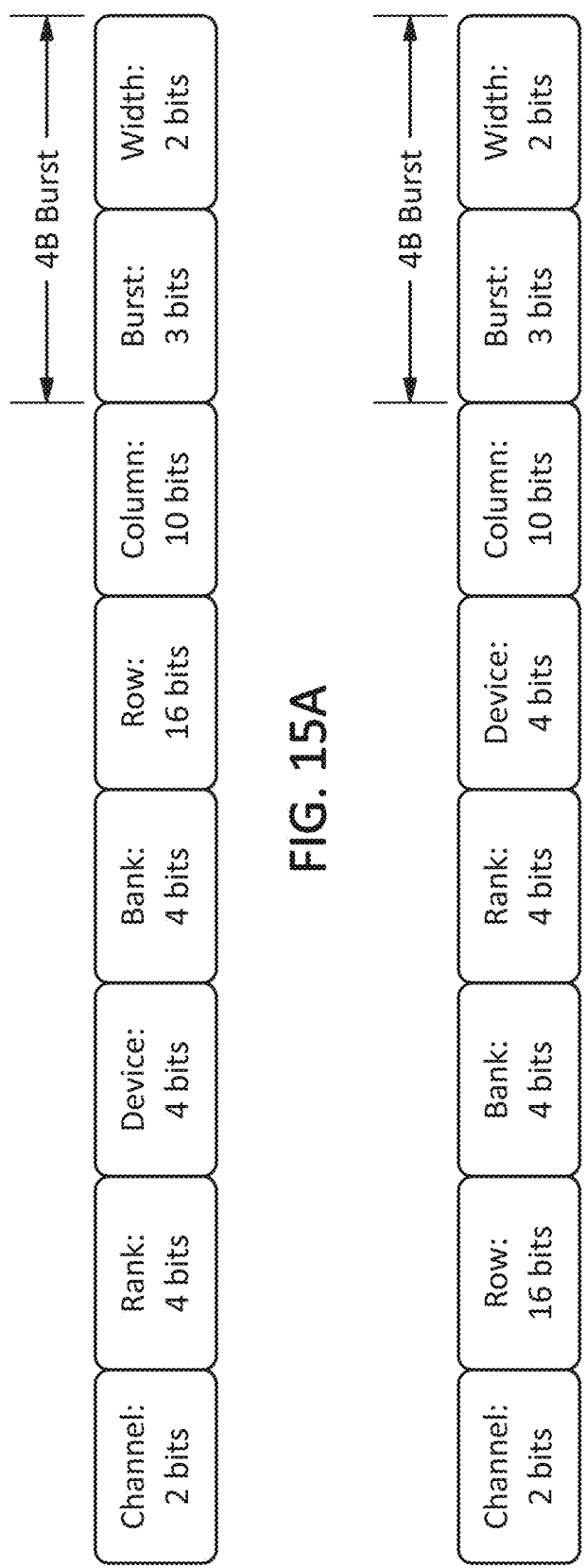

SYSTEMS, METHODS, AND DEVICES FOR NEAR DATA PROCESSING

CROSS-REFERENCE TO RELATED APPLICATIONS

This application claims priority to, and the benefit of, U.S. Provisional Patent Application Ser. No. 63/021,675 titled "DIMM Based Near-Data-Processing Accelerator for K-mer Counting" filed May 7, 2020 which is incorporated by reference.

TECHNICAL FIELD

This disclosure relates generally to data processing, and more specifically to systems, methods, and devices for near data processing.

BACKGROUND

Some data processing applications such as k-mer counting may involve accessing and/or processing small units of data scattered randomly throughout a dataset stored in a working memory space.

The above information disclosed in this Background section is only for enhancement of understanding of the background of the invention and therefore it may contain information that does not constitute prior art.

SUMMARY

A memory module may include one or more memory devices, and a near-memory computing module coupled to the one or more memory devices, the near-memory computing module including one or more processing elements configured to process data from the one or more memory devices, and a memory controller configured to coordinate access of the one or more memory devices from a host and the one or more processing elements. The near-memory computing module may be configured to control a first one of the one or more memory devices based on a first chip select signal and a second one of the one or more memory devices based on a second chip select signal. The one or more memory devices and the near-memory computing module are arranged as a first rank, the memory module further including a second rank, and a hierarchical bus structure configured to transfer data between the first rank and the second rank. The one or more memory devices may include one or more first memory devices, the near-memory computing module may include a first near-memory computing module, and the one or more processing elements may include one or more first processing elements, and the second rank may include one or more second memory devices, and a second near-memory computing module coupled to the one or more second memory devices, the second near-memory computing module including one or more second processing elements configured to process data from the one or more second memory devices, and a second memory controller configured to coordinate access of the one or more second memory devices from a host and the one or more second processing elements. The memory module may further include a hierarchical bus structure, and the near-memory computing module may further include an input buffer coupled between the hierarchical bus structure and the one or more processing elements, and an output buffer coupled between the hierarchical bus structure and the one or more processing elements. The near-memory computing module may further include a workload monitor configured to balance a first workload of a first one of the one or more processing elements and a second workload of a second one of the one or more processing elements.

A method of processing a dataset may include distributing a first portion of the dataset to a first memory module, distributing a second portion of the dataset to a second memory module, constructing a first local data structure at the first memory module based on the first portion of the dataset, constructing a second local data structure at the second memory module based on the second portion of the dataset, and merging the first local data structure and the second local data structure. Merging the first local data structure and the second local data structure may form a merged data structure, and the method may further include performing a counting operation on the merged data structure at the first memory module and the second memory module. Merging the first local data structure and the second local data structure may include reducing the first local data structure and the second local data structure. Reducing the first local data structure and the second local data structure may form a merged data structure, and the method may further include scattering the merged data structure to the first memory module and the second memory module. The method may further include distributing the first portion of the dataset to two or more memory devices at the first memory module. The method may further include distributing the first portion of the dataset to two or more ranks at the first memory module. The first local data structure may be constructed at the first memory module by a first processing element and a second processing element, and the method may further include balancing a first workload of the first processing element and a second workload of the second processing element. The method may further include interleaving memory accesses of the first portion of the dataset between a first task and a second task. The method may further include switching between the first task and the second task between memory accesses of the first portion of the dataset. Merging the first local data structure and the second local data structure may form a first merged data structure, and the method may further include scattering the merged data structure to the first memory module and the second memory module, constructing a third local data structure at the first memory module based on the first merged data structure, constructing a fourth local data structure at the first memory module based on the first merged data structure, merging the third local data structure and the fourth local data structure to form a second merged data structure, and performing a counting operation on the second merged data structure at the first memory module and the second memory module. The dataset may include a genetic sequence, the first local data structure may include a Bloom filter, and the Bloom filter may include one or more k-mers of the genetic sequence.

A system may include a first memory module configured to construct a first local data structure based on a first portion of a dataset, a second memory module configured to construct a second local data structure based on a second portion of the dataset, and a host coupled to the first memory module and the second memory module through one or more memory channels, wherein the host may be configured to distribute the first portion of the dataset to the first memory module, distribute the second portion of the dataset to the second memory module, and merge the first local data structure and the second local data structure. The first local data structure and the second local data structure may form a merged data structure, and the host may be further configured to scatter the merged data structure to the first memory module and the second memory module. The first memory module may be configured to perform a counting operation on the merged data structure.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 15A illustrates an embodiment of a coalesced address mapping scheme for memory devices in accordance with example embodiments of the disclosure.

FIG. 15B illustrates another embodiment of a scattered address mapping scheme for memory devices in accordance with example embodiments of the disclosure.

DETAILED DESCRIPTION

Overview

Figures 1, 2:
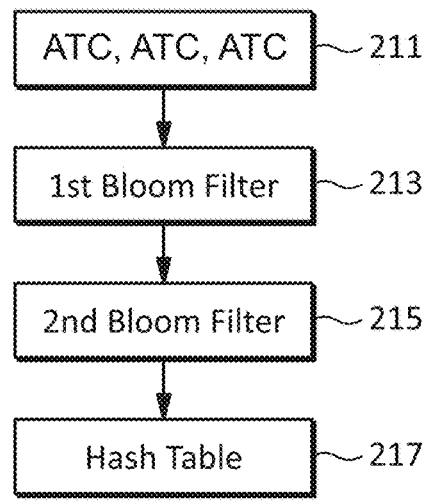
FIG. 1 illustrates an embodiment of a k-mer counting method in accordance with example embodiments of the disclosure.
FIG. 2 illustrates an embodiment of a k-mer counting method and data structures in accordance with example embodiments of the disclosure.

Some data processing applications may involve accessing and/or processing many small units of data (e.g., one bit) scattered randomly throughout a large dataset stored in a working memory space. This type of fine-grained data access and processing may be inefficient and/or time-consuming to implement with a central processing unit (CPU) or other processing unit having a larger data width (e.g., 32 or 64 bits), especially when the data is stored remotely from the processor in a memory system having a bus configured to sequentially access larger units of data (e.g., multiple 64-bit words stored in contiguous memory locations).

A near-data processing (NDP) system in accordance with example embodiments of the disclosure may include a memory module having one or more processing resources configured to process data at the module, thereby reducing or eliminating data transfers to a host processing unit. In some embodiments, a near-data processing system may include one or more features that may facilitate accessing and/or processing fine-grained data units, and/or efficient communication within a memory module.

For example, some embodiments may include one or more near-memory computing (NMC) modules that may include one or more processing elements configured to parallel process multiple relatively small units of data and/or implement one or more specific algorithms or portions thereof. In some embodiments, a near-memory computing module may include one or more features such as a memory controller, a workload monitor, a bus controller, one or more buffers, multiplexers, and/or the like to support data communication and/or synchronization, to enable task scheduling and/or memory accesses, and/or the like. In some embodiments, a near-memory computing module may be included for each rank of memory devices in a memory module.

As another example, some embodiments may implement a hierarchical bus architecture that may enable the efficient transfer of data between ranks within a module, between memory devices within a rank, and/or the Ike. Some embodiments may implement independent chip select (CS) signals which may enable fine-grained memory access of individual memory devices.

A workflow in accordance with example embodiments of the disclosure may distribute portions of a dataset to multiple memory modules having near-data processing capabilities. The memory modules may process their respective portions of the dataset to construct local data structures which may then be merged and/or re-distributed to the memory modules for further processing.

For example, an embodiment of a workflow may implement a k-mer counting process in which the memory modules may construct local Bloom filters. The data from the Bloom filters may then be merged, for example, through a reduction process and then scattered to the memory modules. The memory modules may then perform local counting processes on their copies of the merged and scattered Bloom filters. In some embodiments, the memory modules may implement counting Bloom filters which may facilitate the use of localized processing.

Some embodiments may implement a distributed data mapping scheme to distribute data across memory devices, ranks, memory modules, and/or the like. Depending on the implementation details, this may improve memory bandwidth utilization and/or energy utilization, for example, by reducing or eliminating the concentration of data within memory devices, ranks, memory modules, and/or the like.

Some embodiments may implement a task scheduling scheme based on monitoring the workload of one or more compute resources. For example, a task scheduling scheme may balance the workload between processing elements in a near-memory computing module. Depending on the implementation details, this may improve the utilization of one or more compute resources.

Some embodiments may implement a scattered memory accesses and/or task-switching scheme. For example, memory accesses for one task may be interleaved with memory accesses for one or more other tasks. Depending on the implementation details, this may reduce or eliminate unusable data accesses. Additionally, or alternatively, tasks may be switched between memory accesses, for example, to fill memory access time slots with accesses of usable data. Depending on the implementation details, this may improve memory bandwidth utilization and/or reduce energy consumption.

The principles disclosed herein have independent utility and may be embodied individually, and not every embodiment may utilize every principle. However, the principles may also be embodied in various combinations, some of which may amplify the benefits of the individual principles in a synergistic manner.

K-Mer Counting

K-mer counting may be used to determine the number of subsequences having a length k in a dataset containing a genetic sequence (e.g., a deoxyribonucleic acid (DNA) sequence). For example, a k-mer counting process with k=3 may be used to find the number of each type of 3-mer in the DNA sequence shown at the top of FIG. 1. The results of the k-mer counting process with k=3 may be shown in the table at the bottom of FIG. 1. Thus, the DNA sequence may include one ATC 3-mer, two TCT 3-mers, one CTC 3-mer, and so on. In some embodiments, k-mer counting may be used for applications such as bioinformatics, drug development, evolutionary study, crop improvement, forensic analysis, gene therapy, next generation sequencing (NGS), and/or the like. In some embodiments, applications such as NGS technology may help characterization of the global pandemic Coronavirus Disease 2019 (COVID-19).

In some applications, unique k-mers (e.g., k-mers that may only appear once in the dataset) may have a high probability of containing errors. Therefore, some k-mer counting processes may filter out unique k-mers. For example, in some applications, up to 75 percent of k-mers may be unique, and therefore, eliminating unique k-mers may significantly reduce the memory footprint of a DNA sequence dataset.

FIG. 2 illustrates an embodiment of a k-mer counting method and data structures in accordance with example embodiments of the disclosure. The method illustrated in FIG. 2 may receive a DNA sequence 211 as an input. The method may read and process k-mers in the DNA sequence 211 to construct a series of three data structures which, in this embodiment, may be implemented as a first Bloom filter 213, a second Bloom filter 215, and a hash table 217.

Figure 3:
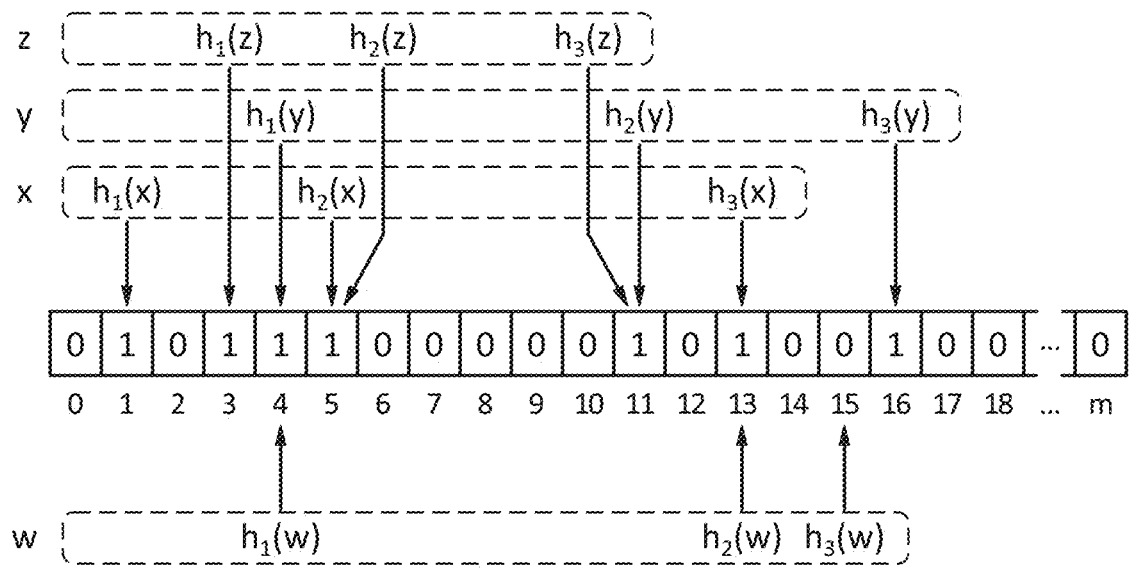
FIG. 3 illustrates an embodiment of a Bloom filter for a k-mer counting method in accordance with example embodiments of the disclosure.

The first Bloom filter 213 may include a bit array with a capacity of m bits and may use n independent hash functions to insert k-mers into the array. The Bloom filter may initially be filled with all zeros. When a k-mer is read from the DNA sequence 211, the n hash functions may be applied to the k-mer to calculate n hash values. The n bits in the bit array corresponding to the n hash values may then be set. For example, if n=3, applying three independent hash functions h1, h2, and h3 to a first k-mer (x) may generate hash values 1, of 5, and 13, respectively (e.g., h1(x)=1, h2(x)=5, and h3(x)=13). Thus, the bits at positions 1, 5, and 13 may be set as shown in FIG. 3. Applying the three hash functions to a second k-mer (y) may generate hash values of 4, 11, and 16, respectively. Thus, the bits at positions 4, 11, and 16 may be set as shown in FIG. 3. Applying the three hash functions to a third k-mer (z) may generate hash values of 3, 5, and 11, respectively. Thus, the bit at position 3 may be set (the bits at positions 5 and 11 may already be set) as shown in FIG. 3.

To check for the existence of a specific k-mer in the first Bloom filter 213, the n hash functions may be applied to the specific k-mer to calculate n hash values. The entries in the n bit positions of the bit array corresponding to the n hash values may then be checked. If any one of the n entries is a zero, it may indicate that the specific k-mer is not present in the Bloom filter 213. (In some embodiments, the Bloom filter 213 may have a zero rate of false negatives.) If all n of the entries are ones, it may indicate with a high level of certainty that the specific k-mer is present in the array. (In some embodiments, the Bloom filter 213 may have a low rate of false positives.)

For example, if n=3, applying the three independent hash functions to the specific k-mer (w) may generate hash values of 4, 13, and 15 as shown in FIG. 3. Because the Bloom filter 213 may contain a zero at bit position 15, it may be concluded that the specific k-mer is not present.

Referring again to FIG. 2, the second Bloom filter 215 may be constructed and operate in a manner similar to the first Bloom filter 213. In some embodiments, the series of two Bloom filters 213 and 215 may be used to implement a pruning processing that may filter out unique k-mers as follows. Each time a new k-mer (w) is read from the dataset 211, the method may check for the existence of the new k-mer (w) in the first Bloom filter 213. If the new k-mer (w) is present in the first Bloom filter 213, this may indicate that it is not a unique k-mer. Therefore, the new k-mer (w) may be written into the second Bloom filter 215. If, however, the new k-mer (w) is not present in the first Bloom filter 213, it may be added to the first Bloom filter 213 so that future checks of the first Bloom filter 213 will indicate that one instance of the new k-mer (w) has already been encountered.

After all k-mers in the input DNA sequence dataset 211 are read and processed in this manner, all of the non-unique k-mers may be stored in the second Bloom filter 215 with the unique k-mers having been filtered out. In some embodiments, the first Bloom filter 213 may then be discarded.

The non-unique k-mers stored in the second Bloom filter 215 may then be counted as follows. For each input k-mer (w) read from the DNA sequence dataset 211, the second Bloom filter 215 may be checked for the existence of the input k-mer (w). If the input k-mer (w) is present in the second Bloom filter 215, a corresponding entry (e.g., a frequency counter) for the input k-mer (w) in the hash table 217 may be incremented. In some embodiments, the value of a frequency counter for a k-mer (w) may indicate the number of instances of the k-mer (w) in the DNA sequence dataset 211. Thus, after all k-mers have been read and processed, the hash table 217 may store the frequency of occurrence of all non-unique k-mers in the dataset 211.

In some embodiments, the method illustrated in FIG. 2 may involve many fine-grained memory accesses and/or processing operations performed on relatively small units of data for both the Bloom filters 213 and 215, and the hash table 217.

Near-Data Processing Architecture

Figure 4:
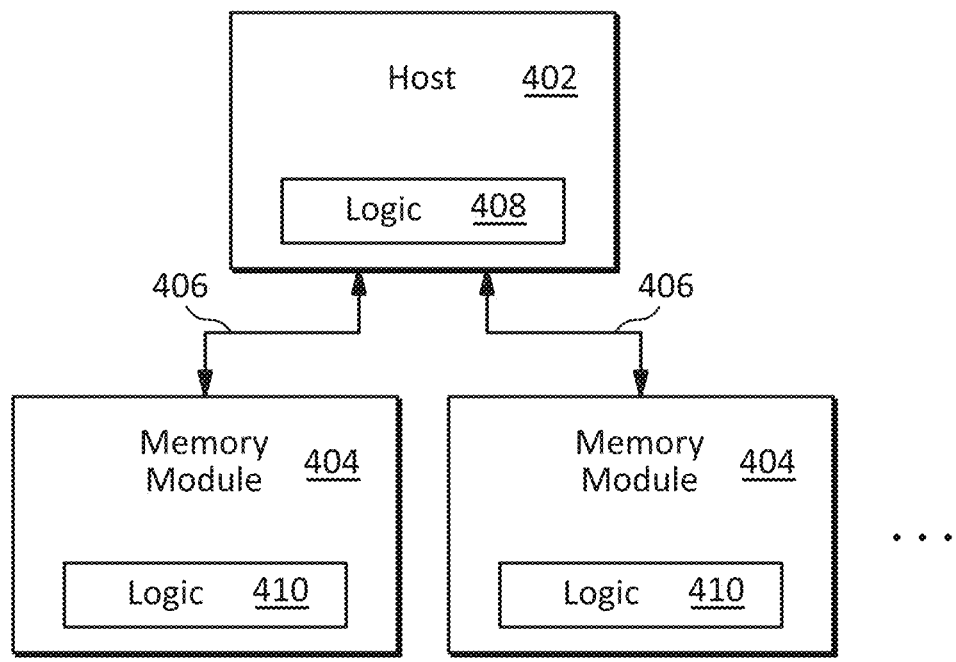
FIG. 4 illustrates an embodiment of a near-data processing system in accordance with example embodiments of the disclosure.

FIG. 4 illustrates an embodiment of a near-data processing system in accordance with example embodiments of the disclosure. The system illustrated in FIG. 4 may include a host 402 and two or more memory modules 404. The host 402 may be connected to the memory modules 404 through one or more memory channels 406. The system illustrated in FIG. 4 may further include logic 408 and/or 410 which may cause the components to distribute portions of a dataset to the memory modules 404, process the portions of the dataset to construct local data structures at the memory modules 404, merge the local data structures, and/or perform one or more counting operations on the merged data structures.

The logic 408 and/or 410 and/or portions thereof may be located at any of the components illustrated in FIG. 4. For example, in some embodiments, logic 408 may be located at the host 402 and may control the distribution of the dataset to the memory modules 404 and/or the merging of the local data structures, whereas logic 410 may be located at each of the memory modules 404 and may control the processing of the distributed portions of the dataset, construction of the local data structures, and/or counting operations at the memory modules 404.

The host 402 may be implemented with any type of processing apparatus such as one or more CPUs, graphics processing units (GPUs), neural processing units (NPUs), tensor processing units (TPUs), and/or the like, including complex instruction set computer (CISC) processors such as x86 processors and/or reduced instruction set computer (RISC) processors such as ARM processors, and/or the like executing instructions stored in any type of memory.

The one or more memory channels 406 may be implemented with any type of interface suitable for memory interconnects such as any generation of double data rate (DDR) interface, Open Memory Interface (OMI), Peripheral Component Interconnect Express (PCIe), Compute Express Link (CXL), Advanced eXtensible Interface (AXI), Open Coherent Accelerator Processor Interface (OpenCAPI), Gen-Z, and/or the like. The one or more memory channels 406 may be arranged in any configuration, for example, with both memory modules 404 connected to the host 402 through a single multi-drop bus, with each memory module 404 connected to the host 402 through a separate point-to-point bus, and/or the like.

The memory modules 404 may be implemented with any type and/or configuration of memory devices, buffers, interfaces (including those described above), and/or the like, arranged in any physical configuration. For example, the memory modules 404 may be implemented with any type of memory devices including volatile memory such as dynamic random access memory (DRAM) and/or static random access memory (SRAM), nonvolatile memory such as flash memory including not-AND (NAND) memory, persistent memory such as cross-gridded nonvolatile memory, memory with bulk resistance change, and/or the like, and/or any combination thereof. The memory modules 404 may be configured as single in-line memory modules (SIMMs), dual in-line memory modules (DIMMs), small outline DIMMs (SO-DIMMs), load-reduced DIMMS (LRDIMMs), and/or the like. In some embodiments, one or more of the memory modules 404 may not be implemented as separate physical components, but instead may simply be implemented, for example, as a portion of a circuit board having one or more memory devices and any support circuitry, traces, and/or the like, and which may be capable of functioning as a memory module.

The logic 408 and/or 410 and/or portions thereof may be implemented with hardware, software, or any combination thereof. For example, in some embodiments, any of the logic may be implemented with combinational logic, sequential logic, one or more timers, counters, registers, state machines, volatile memories such as DRAM and/or SRAM, nonvolatile memory such as flash memory, complex programmable logic devices (CPLDs), field programmable gate arrays (FPGAs), application specific integrated circuits (ASICs), CISC processors and/or RISC processors, and/or the like executing instructions, and/or the like, as well as CPUs, GPUs, NPUs, TPUs, and/or the like.

Figure 5:
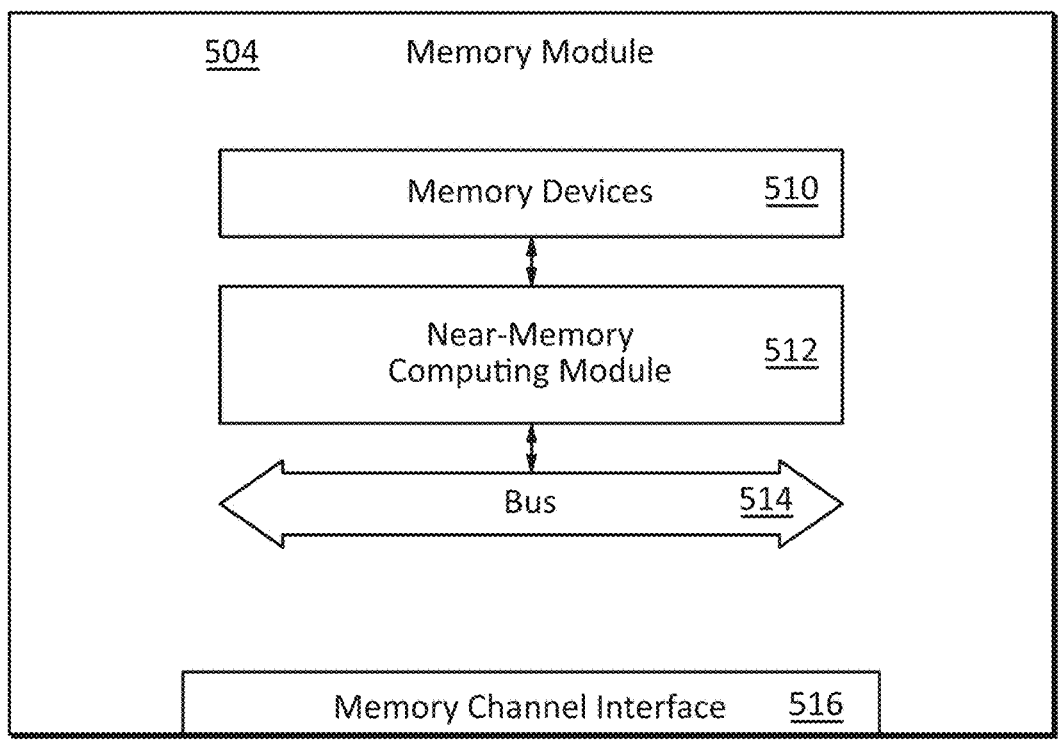
FIG. 5 illustrates an embodiment of a memory module having near-data processing capabilities in accordance with example embodiments of the disclosure.

FIG. 5 illustrates an embodiment of a memory module having near-data processing capabilities in accordance with example embodiments of the disclosure. The memory module 504 illustrated in FIG. 5 may be used, for example, to implement any of the memory modules 404 illustrated in FIG. 4. The memory module 504 illustrated in FIG. 5 may include a rank of one or more memory devices 510, a near-memory computing module 512, a bus structure 514, and a memory channel interface 516.

The one or more memory devices 510 may be implemented with any type and/or configuration of memory devices, for example, as described above with respect to the memory modules 404.

The near-memory computing module 512 may include one or more processing elements capable of processing any units of data received from the rank of memory devices 510, another rank of memory devices and/or another memory module through the bus structure 514, and/or the like. In some embodiments, the near-memory computing module 512 may include one or more features, for example, any type of general-purpose and/or specialized controller such as a memory controller, a bus controller, and/or the like, a workload monitor, one or more input and/or output buffers, one or more multiplexers and/or demultiplexers, and/or the like, to implement task scheduling, memory accesses, and/or the like. In some embodiments, the near-memory computing module 512 may implement any of a wide range of functions, for example, k-mer counting, encryption and/or decryption, deduplication, encoding and/or decoding, error correction, any types of data filtering, and/or the like. In some embodiments, the near-memory computing module 512 may implement any type of general controller function, for example, input and/or output (I/O) control, one or more control algorithms, supervisory control, baseboard control, programmable logic control, process control, and/or the like. The near-memory computing module 512 and/or any portions and/or features thereof, may be implemented with hardware, software, or any combination thereof as described above with respect to logic 408 and/or 410.

The bus structure 514 may be implemented, for example, with a hierarchical bus architecture that may transfer data between memory devices within a rank, between memory devices and the memory channel interface 516, and/or the like. In some embodiments, independent chip select signals which may enable fine-grained memory access of the individual memory devices 510. The bus structure 514 may be implemented using any type of signaling and/or configuration including multi-drop, point-to-point, and/or the like.

Figure 6:
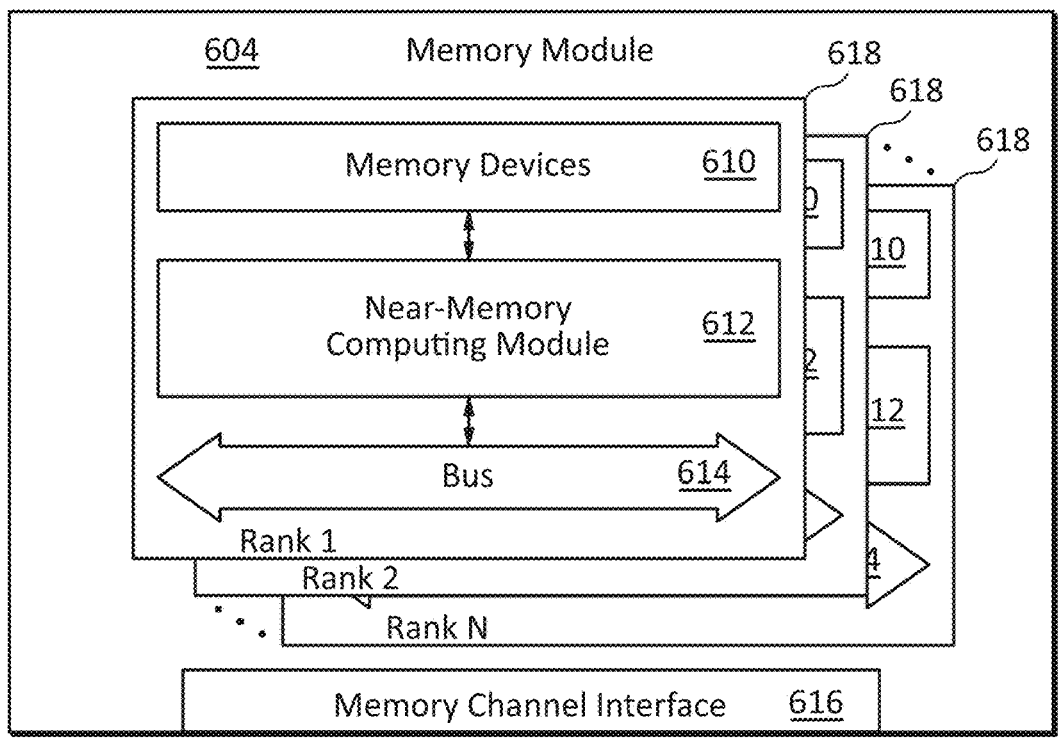
FIG. 6 illustrates an embodiment of a memory module having multiple ranks and near-data processing capabilities in accordance with example embodiments of the disclosure.

FIG. 6 illustrates another embodiment of a memory module having near-data processing capabilities in accordance with example embodiments of the disclosure. The memory module 604 illustrated in FIG. 6 may include components similar to those illustrated in FIG. 5, however, multiple, instances of the one or more memory devices 610, near-memory computing module 612, and or bus structure 614 may be configured, for example, as multiple ranks 618.

In the embodiment illustrated in FIG. 6, one or more of the bus structures 614 may be implemented with a hierarchical bus architecture that may transfer data between the different ranks 618, as well as between memory devices within a rank, between memory devices and the memory channel interface 616, and/or the like.

The embodiments illustrated in FIGS. 4 through 6 are not limited to any specific applications and may be used to implement a wide variety of processing methods, workflows, and/or the like. However, depending on the implementation details, they may be particularly effective for implementing data processing applications that may be memory bound and/or may involve fine-grained memory accesses such as k-mer counting, DNA seeding, and/or the like.

For purposes of illustrating the principles of this disclosure, some example embodiments of systems, memory modules, near-memory computing module, methods, workflows, and/or the like may be described below in the context of k-mer counting applications, and with some specific implementation details such as LRDIMMs, DDR memory interfaces, and/or the like. However, the principles are not limited to k-mer counting applications and may be applied to a wide variety of other applications and/or may be realized with many different implementation details.

For purposes of illustration, FIGS. 7 through 10 collectively illustrate an example architecture of a near-data processing system and some example components that may be used therewith, in accordance with example embodiments of the disclosure.

Figure 7:
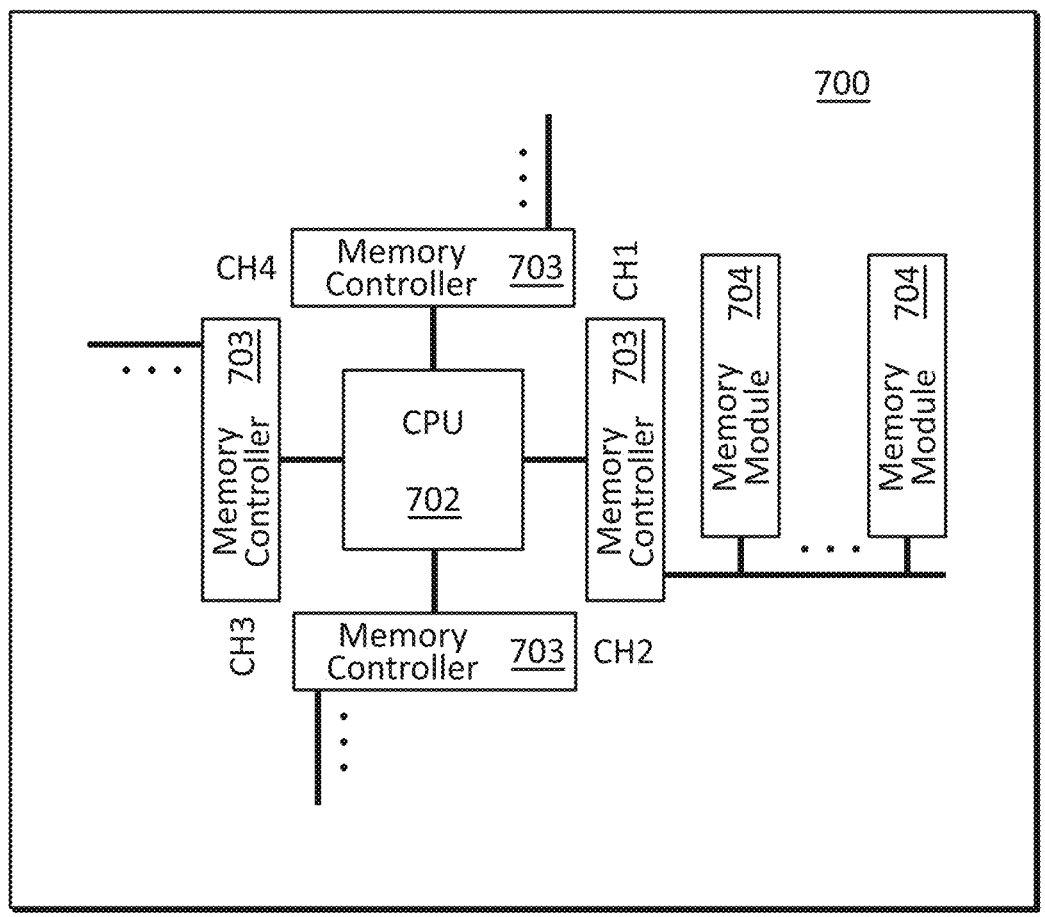
FIG. 7 illustrates an example embodiment of a near-data processing system in accordance with example embodiments of the disclosure.

FIG. 7 illustrates an example embodiment of a near-data processing system in accordance with example embodiments of the disclosure. The system 700 illustrated in FIG. 7 may include a host CPU 702, and one or more memory controllers 703 configured to implement DDR memory channels which, in the embodiment illustrated in FIG. 7 may include memory channels CH1, CH2, CH3, and/or CH4. One or more of the memory channels may have one or more DIMMs 704 installed. The numbers of components illustrated in FIG. 7 are illustrative only, and fewer or more components may be used. To prevent the drawing from becoming obscured, not all components may be shown.

Figure 8:
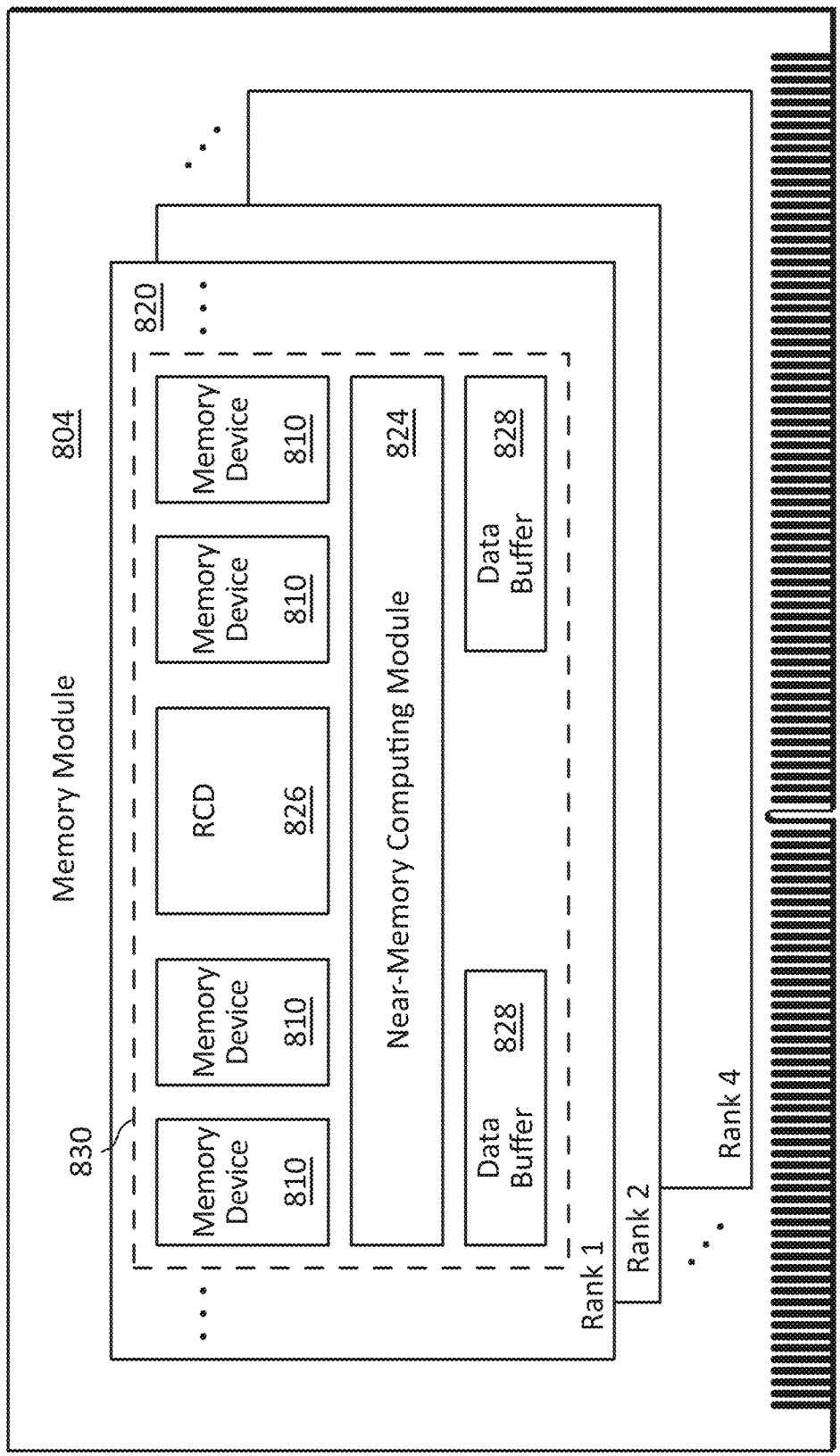
FIG. 8 illustrates an example embodiment of a memory module in accordance with example embodiments of the disclosure.

FIG. 8 illustrates an example embodiment of a memory module in accordance with example embodiments of the disclosure. The embodiment illustrated in FIG. 8 may be used, for example, to implement any of the DIMMs 704 shown in FIG. 7. The memory module 804 illustrated in FIG. 8 may be implemented, for example, with an LRDIMM which may include one or more ranks 820, each of which may include one or more memory devices 810, and a near-memory computing module 824. The memory module 804 may also include a registering clock driver (RCD) 826 and one or more data buffers 828 which may collectively form a memory buffer. The registering clock driver 826 may buffer and/or repeat command and/or address signals (C/A) received from a host (e.g., 702) through a DDR memory channel. The one or more data buffers 828 may buffer data signals DO to and/or from the memory devices 810 to preserve and/or improve the integrity of the signals. The memory module 804 may be physically connected to one of the memory channels (e.g., CH1, CH2, . . . ) through a card edge connector 828.

Figure 9:
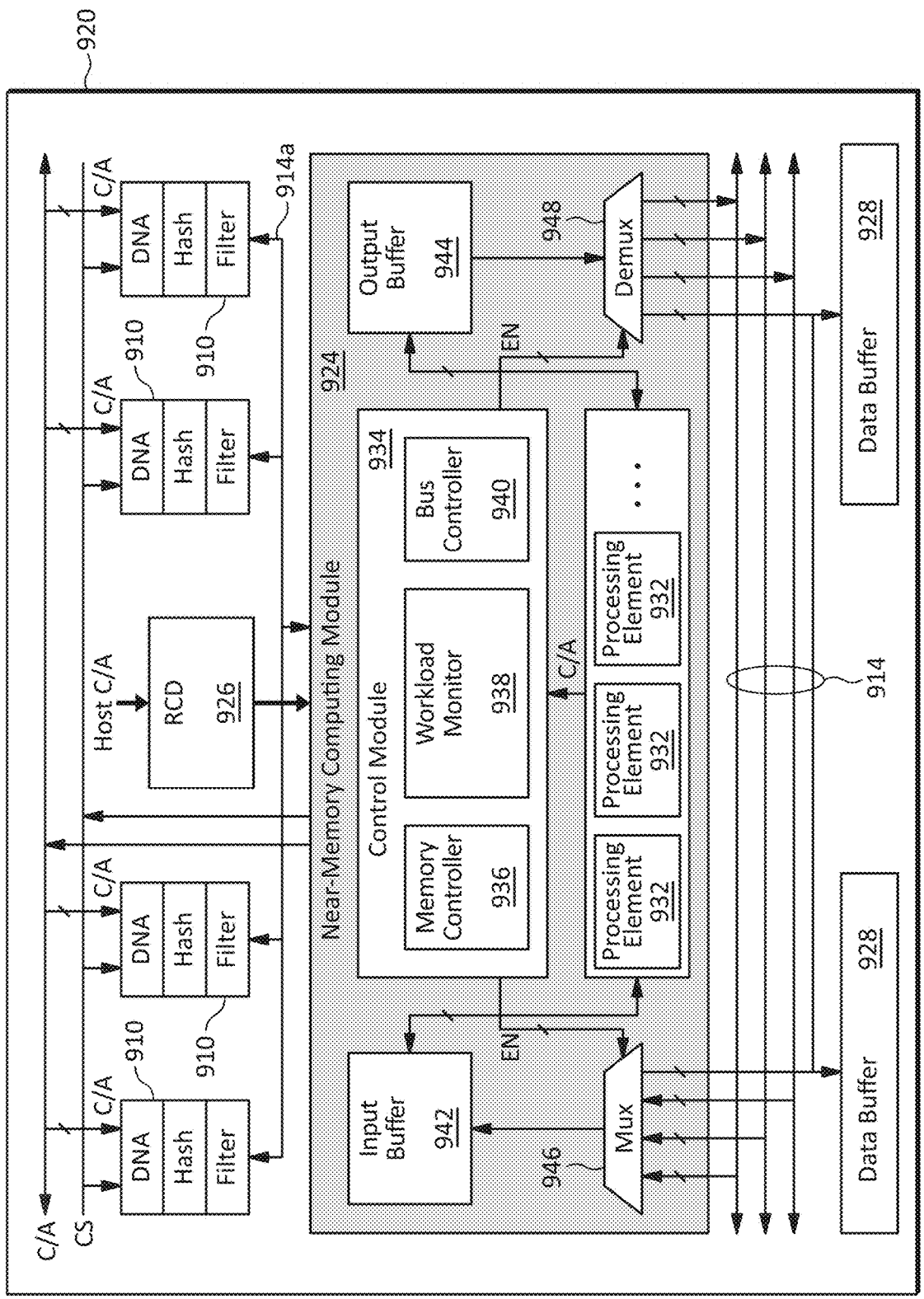
FIG. 9 illustrates a more detailed example embodiment of a rank, or portion thereof, of a memory module in accordance with example embodiments of the disclosure.

FIG. 9 illustrates a more detailed example embodiment of a rank, or portion thereof, of a memory module in accordance with example embodiments of the disclosure. The embodiment illustrated in FIG. 9 may be used, for example, to implement the portion shown by dashed line 830 of one of the ranks 820 illustrated in FIG. 8. The rank 920 illustrated in FIG. 9 may include one or more memory devices 910, each of which may have a region (DNA) for storing a portion of a dataset having an input DNA sequence, a region (Hash) for storing a portion of one or more hash tables as the output of a k-mer counting operation, and a region (Filter) for storing one or more Bloom filters for a k-mer counting operation.

A near-memory computing module 924 may include one or more processing elements 932, and a control module 934, which may include one or more of a memory controller 936, a workload monitor 938, and/or a bus controller 940. The near-memory computing module 924 may further include an input buffer 942 and an output buffer 944 for the processing elements 932. The input buffer 942 may be coupled to a hierarchical bus structure 914 through a multiplexer 946, and the output buffer 944 may be coupled to the hierarchical bus structure 914 through a demultiplexer 948. The multiplexer 946 and demultiplexer 948 may be controlled by one or more enable signals EN from the control module 934.

The memory devices 910 may be controlled by one or more C/A signals and/or CS signals generated by the control module 934, at least in part, in response to one or more Host C/A signals received from a host through the registering clock driver 926, Data may be transferred to and/or from the memory devices 910 by a data bus 914a which may be part of the hierarchical bus structure 914. The hierarchical bus structure 914 may couple the rank 920 to the DDR memory channel through one or more data buffers 928.

Figure 10:
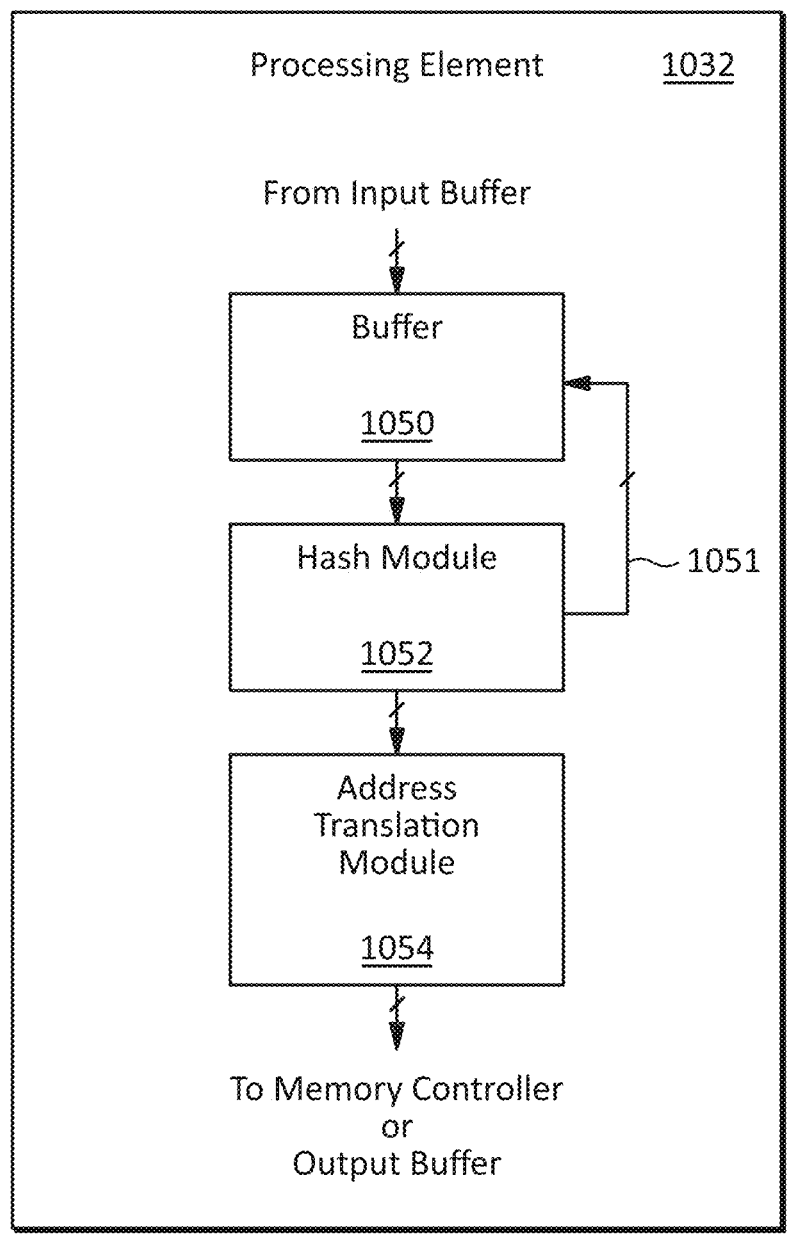
FIG. 10 illustrates an example embodiment of a processing element in accordance with example embodiments of the disclosure.

FIG. 10 illustrates an example embodiment of a processing element in accordance with example embodiments of the disclosure. The processing element illustrated in FIG. 10 may be used, for example, to implement any of the processing elements 932 shown in FIG. 9, The processing element 1032 illustrated in FIG. 10 may include an input buffer 1050 and a hash module 1052 which may receive an input from the input buffer 1050 and may provide a feedback output to the input buffer 1050 through a feedback connection 1051. The processing element 1032 may further include an address translation module 1054 which may receive an input from the hash module 1052 and provide an output to the memory controller 936 and/or output buffer 944.

Referring to FIGS. 7 through 10, in some embodiments, and depending on the implementation details, centralizing logic such as one or more processing elements and/or control functions such as memory control, workload monitoring, workload control, and/or bus control within each rank may improve communications and/or synchronization between components within each rank and/or between ranks. Centralizing the logic may also improve memory access management, task management, and/or the like.

The use of a hierarchical bus may improve the speed and/or efficiency of communications within a memory module (e.g., enhance intra-DIMM communication) and/or may reduce communications between memory modules (e.g., reduce inter-DIMM communication). In some embodiments, a hierarchical bus may enable data to be transferred between memory devices (e.g., inter-chip communication). In some embodiments, a hierarchical bus may include a rank-rank C/A bus, which may transfer C/A signals between different ranks within the same memory module, and/or a rank-rank data bus, which may transfer data between different ranks within the same memory module. In some embodiments, with one or more inter-rank buses, intra-DIMM communication may be achieved locally without sending data through a memory channel to a host, which may reduce or eliminate a source of communication bottlenecks.

Referring to FIG. 9, in some embodiments, the number of processing elements (PEs) 932 inside each near-memory computing module may be configurable. The processing elements 932 may read input data from the input buffer 942 and write output data to the output buffer 944 in the near-memory computing module 924. In some embodiments, one or more of the processing elements 932 may be configured to parallel process multiple relatively small units of data and/or implement one or more specific algorithms or portions thereof. For example, in some embodiments, a primary function of one or more of the processing elements 932 may be to apply one or more hash functions (e.g., MurmurHash3) to input data, for example, k-mers read from a portion of a DNA sequence dataset stored in memory devices 910.

Referring to FIG. 10, in some embodiments of a processing element 1032, the buffer 1050 may store input k-mers from a DNA sequence, the hash module 1052 may include logic to perform one or more hash functions (e.g., independent has functions) on the k-mers, and the address translation module 1054 may include logic to convert virtual addresses to local memory device (e.g., DRAM) addresses. In some embodiments, the address translation module 1054 may be used to implement, at least in part, an address mapping scheme to distribute fine-grained data, for example, to improve memory bandwidth utilization.

Referring to FIG. 9, in some embodiments, the memory controller 936 may coordinate access of the one or more memory devices 910 from a host and the one or more processing elements 932. Coordination between a host-side memory controller (e.g., one of memory controllers 703 in FIG. 7) the memory controller 936 within one or more near-memory computing modules 924 may implement, for example, with host-prioritized request scheduling.

In some embodiments, a host-side memory controller may not be aware that a module-side memory controller 936 in a memory module may send requests to the memory devices 910. Thus, timing issues may arise if both a host-side memory controller and a module-side memory controller 936 send overlapping requests to one of the memory devices 910. Host-prioritized request scheduling may resolve this type of timing issue, for example, by implementing a close-page policy in the host-side implementing a host-prioritized request scheduling for the module-side. For example, with a close-page policy, a host-side memory controller may expect its memory requests to the memory devices 910 to comply with one or more DDR timing constraints. Because a module-side memory controller 936 may issue requests to the memory devices 910, the latency for memory requests from the host-side memory controller may be unpredictable and therefore may conflict with one or more DDR timing constraints. Thus, host-prioritized request scheduling may serve memory requests from the host as soon as the memory devices 910 complete a current task. In some embodiments, one or more host-side DDR timing parameters may be modified so a host-side memory manager may have a longer expectation of data return time to allow a module-side memory controller 936 to schedule requests.

The workload monitor 938 may monitor and/or cooperate with the input buffer 942 and/or one or more processing elements 932 to balance workloads of the processing elements, for example, during k-mer counting, which may improve the utilization of the processing elements 932.

The bus controller 940, which may be implemented, for example, as a bus arbiter, may regulate data and or C/A transfers on the hierarchical bus structure 914, In some embodiments, the bus controller 940 may assign resources of the hierarchical bus structure to the one or more processing elements 932.

Near-Data Processing Workflows

Figure 11A:
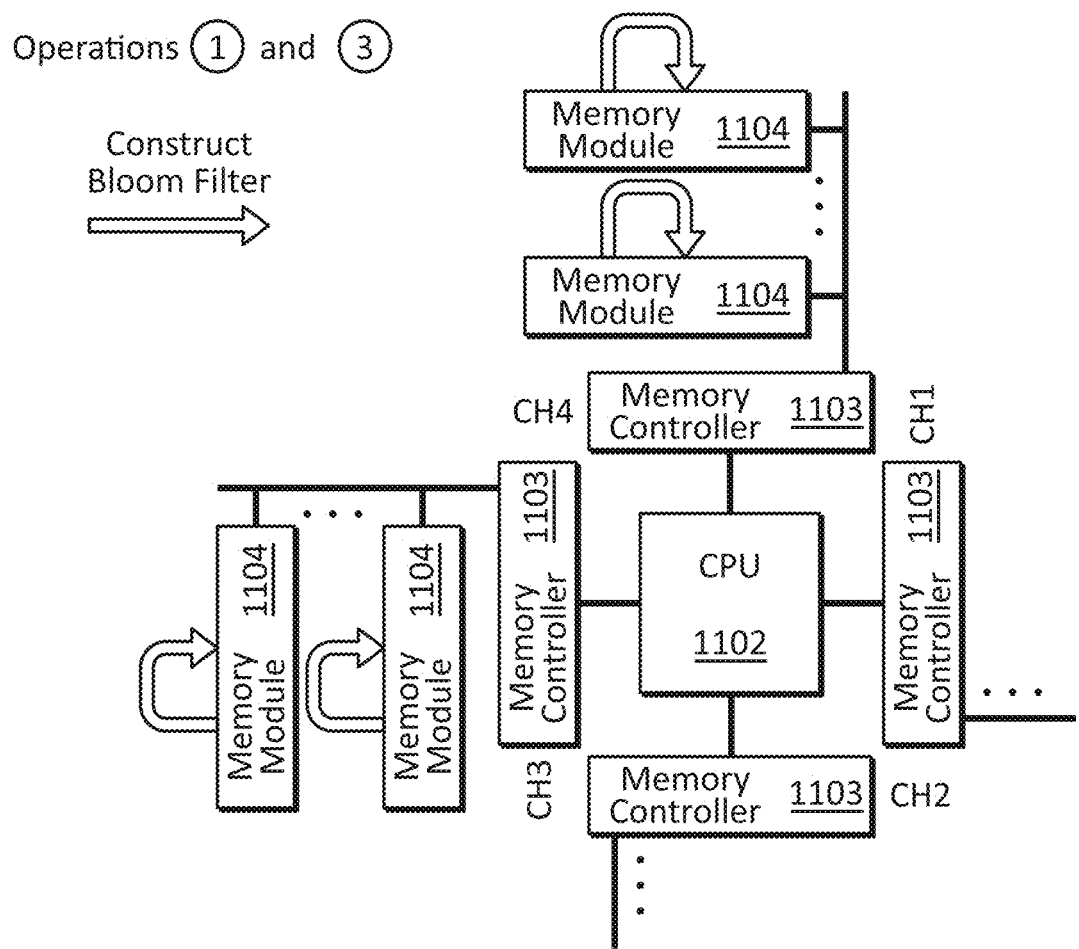
FIG. 11A illustrates an embodiment of first and second Bloom filter construction operations in accordance with example embodiments of the disclosure.
Figure 11B:
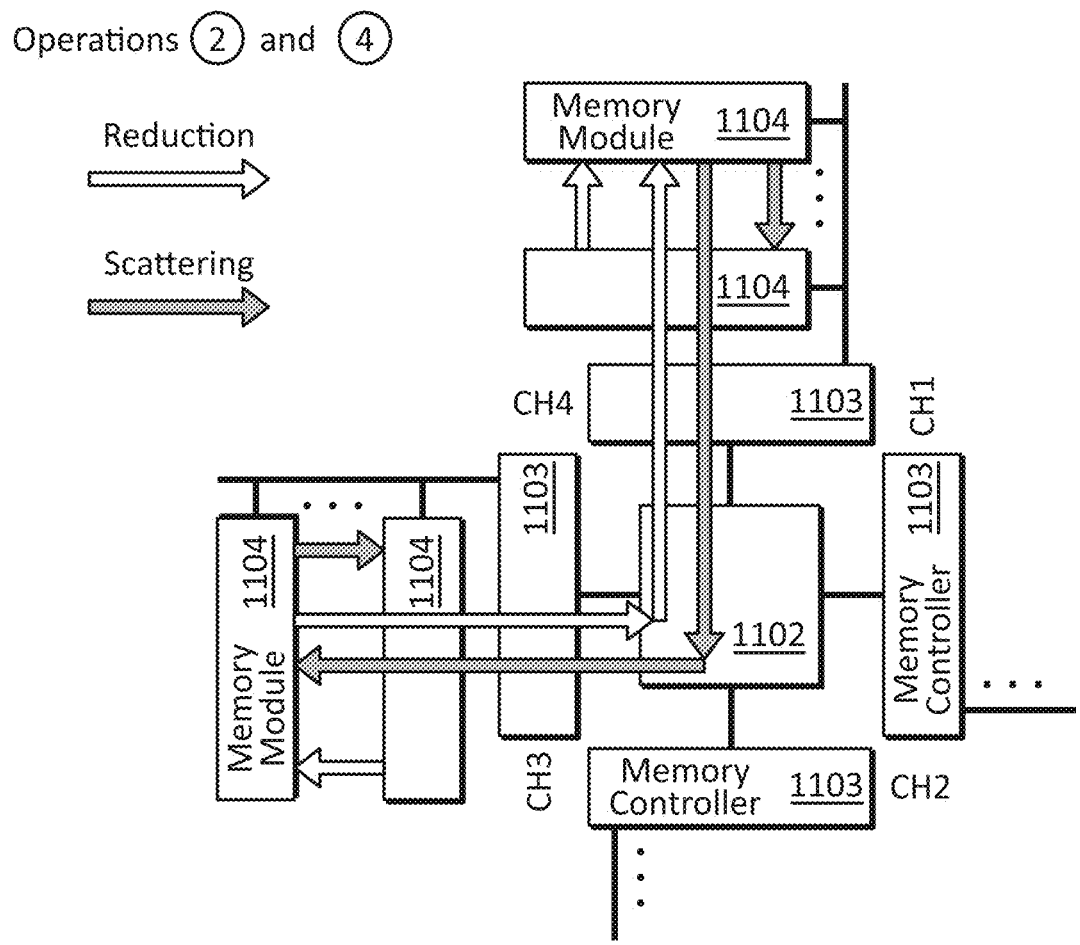
FIG. 11B illustrates an embodiment of first and second merge operations in accordance with example embodiments of the disclosure.
Figure 11C:
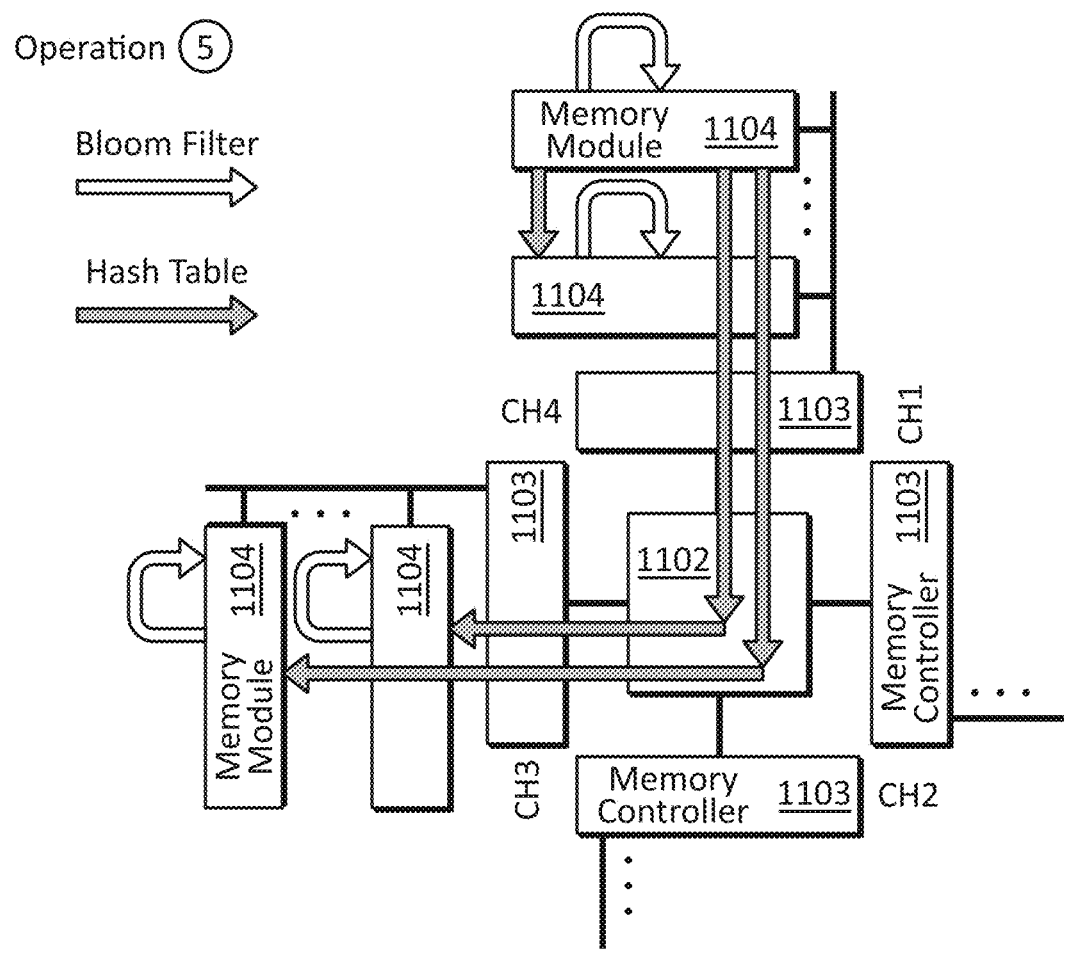
FIG. 11C illustrates an embodiment of a count operation in accordance with example embodiments of the disclosure.

FIGS. 11A through 11C illustrate an example embodiment of a k-mer counting workflow in accordance with example embodiments of the disclosure. FIG. 11A illustrates an embodiment of first and second Bloom filter construction operations in accordance with example embodiments of the disclosure. FIG. 11B illustrates an embodiment of first and second merge operations in accordance with example embodiments of the disclosure. FIG. 11C illustrates an embodiment of a count operation in accordance with example embodiments of the disclosure. For purposes of illustration, the embodiment illustrated in FIGS. 11A through 11C may be described in the context of the system illustrated in FIG. 7, but the workflow may be used with any suitable system. The embodiments illustrated in FIGS. 11A through 11C may each include a host CPU 1102, one or more memory controllers 1103, and one or more memory modules 1104.

To enable parallel processing in a k-mer counting workflow, an input dataset, which may include, for example, a DNA sequence, may be evenly partitioned into portions that may be distributed to different memory modules 1104, which in this example may be implemented as DIMMs. During a first Bloom filter construction operation ①, as illustrated in FIG. 11A, each memory module 1104 may construct a first local Bloom filter independently as shown by the arrows. During this operation, each memory module may read a local portion of the dataset and use the data to construct a first local Bloom filter which may also be stored locally. During this operation, inter-module communication may be reduced or eliminated by the use of task partitioning and/or localization of data.

After completing the first Bloom filter construction, the local Bloom filters may be reduced and scattered during a first merge operation ② which may synchronize the Bloom filters in the different memory modules 1104, as illustrated in FIG. 11B. In some embodiments, the Bloom filters may only contain zeros and ones, and therefore, the Bloom filters may be reduced as shown by the unshaded arrows, for example, by using an OR operation between corresponding Bloom filter entries. After reduction, the reduced Bloom filters may be scattered as shown by the shaded arrows, for example, by broadcasting the reduced Bloom filters to the memory modules 1104. In some embodiments, the reduction and/or scatter operations may only involve sequential read and/or write operations for data transfers.

After synchronization of the first Bloom filters in the memory modules 1104, each memory module 1104 may construct a second Bloom filter independently and/or in parallel during a second Bloom filter construction operation ③, as shown by the arrows in FIG. 11A. This operation may be similar to the first Bloom filter construction operation except that the memory modules may construct the second Bloom filters using the merged Bloom filters from the first merge operation as inputs. The second Bloom filter constructed at each memory module 1104 may be stored locally at the corresponding memory module. As with the first Bloom filter construction operation, inter-module communication may be reduced or eliminated by the use of task partitioning and/or localization of data.

After construction of the second Bloom filters, the second Bloom filters may be reduced and scattered during a second merge operation ④ which may synchronize the second Bloom filters in the different memory modules 1104, as illustrated in FIG. 11B. In some embodiments, the second Bloom filters may only contain zeros and ones, and therefore, the second Bloom filters may be reduced as shown by the unshaded arrows, for example, by using an OR operation between corresponding Bloom filter entries. After reduction, the second reduced Bloom filters may be scattered as shown by the shaded arrows, for example, by broadcasting the reduced Bloom filters to the memory modules 1104. As with the first merge operation, in some embodiments, the second reduction and/or scatter operations may only involve sequential read and/or write operations for data transfers.

After completion of the construction of the second Bloom filters, each memory module 1104 may contain a copy of the second Bloom filter. Then a k-mer counting operation may then be performed in parallel at the memory modules. During the k-mer counting operation, for each k-mer, the memory module may first check the second Bloom filter as shown by the unshaded arrows in FIG. 11C to determine if the current k-mer is non-unique. If the current k-mer is non-unique, the entry corresponding to the current k-mer in the hash table, which may be distributed among different memory modules 1104, may be accessed as shown by the shaded arrows in FIG. 11C and incremented by one. In some embodiments, this operation may reduce or eliminate inter-module communication, for example, because inter-module communication may only be used for verified non-unique k-mers.

Thus, in the embodiment illustrated in FIGS. 11A through 11C, depending on the implementation details, processing for k-mer counting may be performed in parallel by memory modules 1104. Moreover, local construction of the first and second Bloom filters may improve system performance because it may involve little or no inter-module communication. The reduction and scattering of the first and second Bloom filters may only involve continuous sequential read and/or write operations which may have little or no impact on performance. Additionally, unnecessary inter-module memory access may be avoided during the k-mer counting operation by checking the second Bloom filter which may be stored locally.

In some embodiments, and depending on the implementation details, the use of two Bloom filters in series in a system and/or workflow in which an input dataset may be distributed to multiple memory modules may lead to one or more false negative results. This may be illustrated in FIG. 12, where a k-mer counting method using a global dataset is illustrated on the left side of the drawing. A DNA sequence 1211 including three instances of the 3-mer ATC may be applied as input without any partitioning. A first global Bloom filter 1213 may read the three instances of the ATC 3-mer and pass the 3-mer to a second global Bloom filter 1215 because the first global Bloom filter 1213 may recognize that the ATC 3-mer is non-unique. The second global Bloom filter 1215 may then increment a count corresponding to the ATC 3-mer in a hash table 1217.

Figure 12:
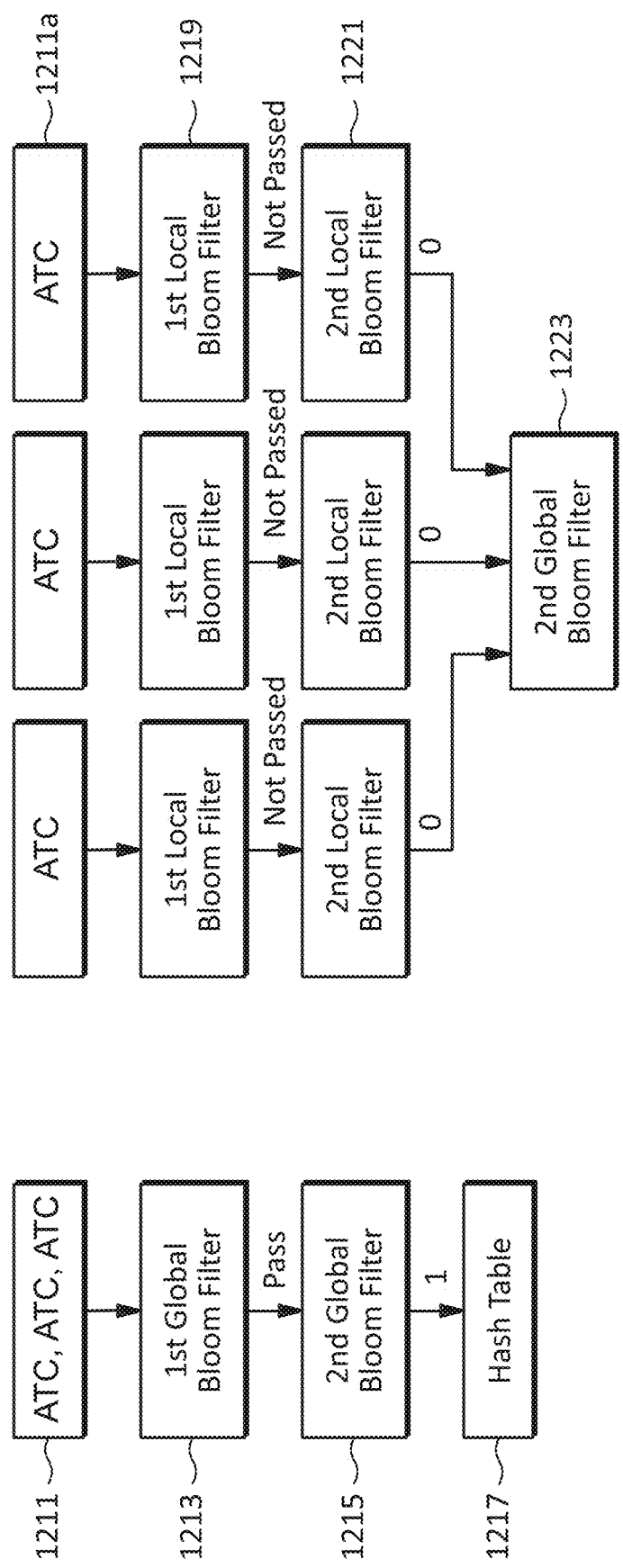
FIG. 12 illustrates an embodiment of a k-mer counting method using a global dataset in accordance with example embodiments of the disclosure.

However, if the dataset including the DNA sequence is distributed to three different memory modules, and only one instance of the ATC 3-mer 1211*a* is distributed to each of the memory modules as shown on the right of FIG. 12, the first local Bloom filter 1219 at each memory module may determine the AIC 3-mer to be unique and therefore not pass the ATC 3-mer to the second local Bloom filter 1221 at the memory module. Thus, there may be no entry for the ATC 3-mer in the final hash table 1223.

In some embodiments, false negatives may be reduced or eliminated by using a counting Bloom filter at each memory module. A counting Bloom filter may use n independent hash functions in a manner similar to a Bloom filter with an array of single bits. However, rather than an array of single bits, a counting Bloom filter may contain an array of counters corresponding to the possible hash values that may be calculated by the n hash functions. For example, a counting Bloom filter with an array of 4-bit counters may be able to track from zero to 15 instances of a specific k-mer. Thus, if n=3, for a specific k-mer (x), the counters corresponding to the calculated hash values $h1(x)$, $h2(x)$, and $h3(x)$ may each be incremented by one. To look up a specific k-mer in a counting Bloom filter, the n independent hash functions may be used to calculate n hash values for the specific k-mer, and the counters corresponding to the calculated hash values may be read. The value of the counter having the smallest count may be assumed to be the number of instances of the specific k-mer.

Figure 13:
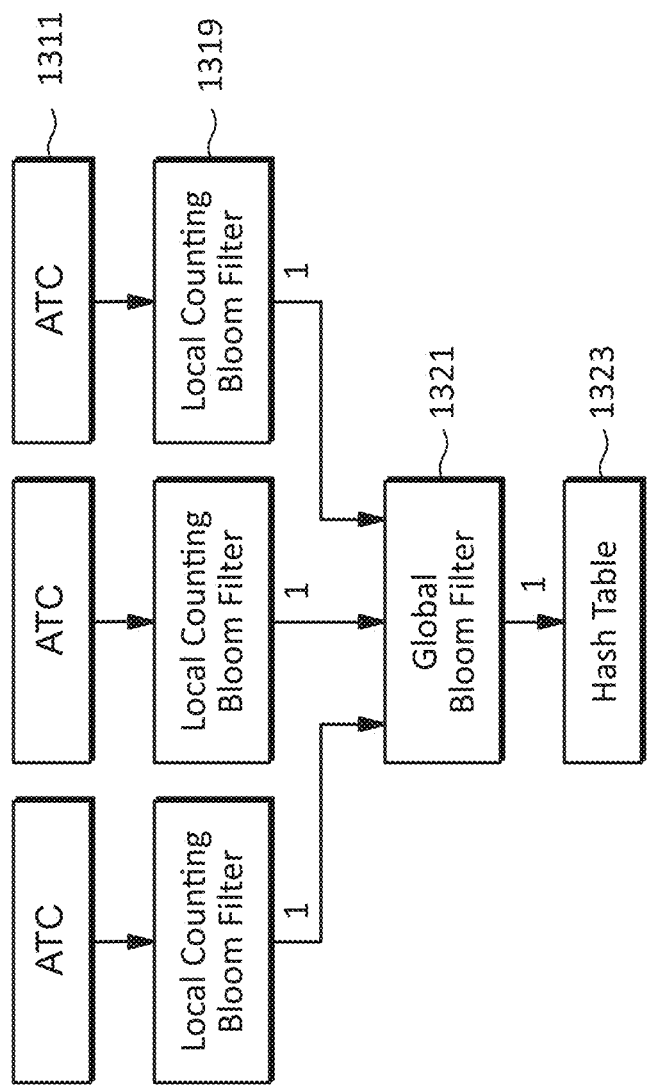
FIG. 13 illustrates an embodiment of a k-mer counting method workflow in accordance with example embodiments of the disclosure.

FIG. 13 illustrates an embodiment of a k-mer counting method workflow in accordance with example embodiments of the disclosure. In the embodiment illustrated in FIG. 13, a dataset including three instances of the ATC 3-mer may be distributed to three different memory modules, and only one instance of the ATC 3-mer 1311 may be distributed to each of the memory modules. However, each memory module may include a local counting Bloom filter 1319 that may count one instance of ATC, and the count of 1 may be passed to a global Bloom filter 1321. Thus, ATC may be recognized as being a non-unique 3-mer and added to the final hash table 1323.

Figure 14A:
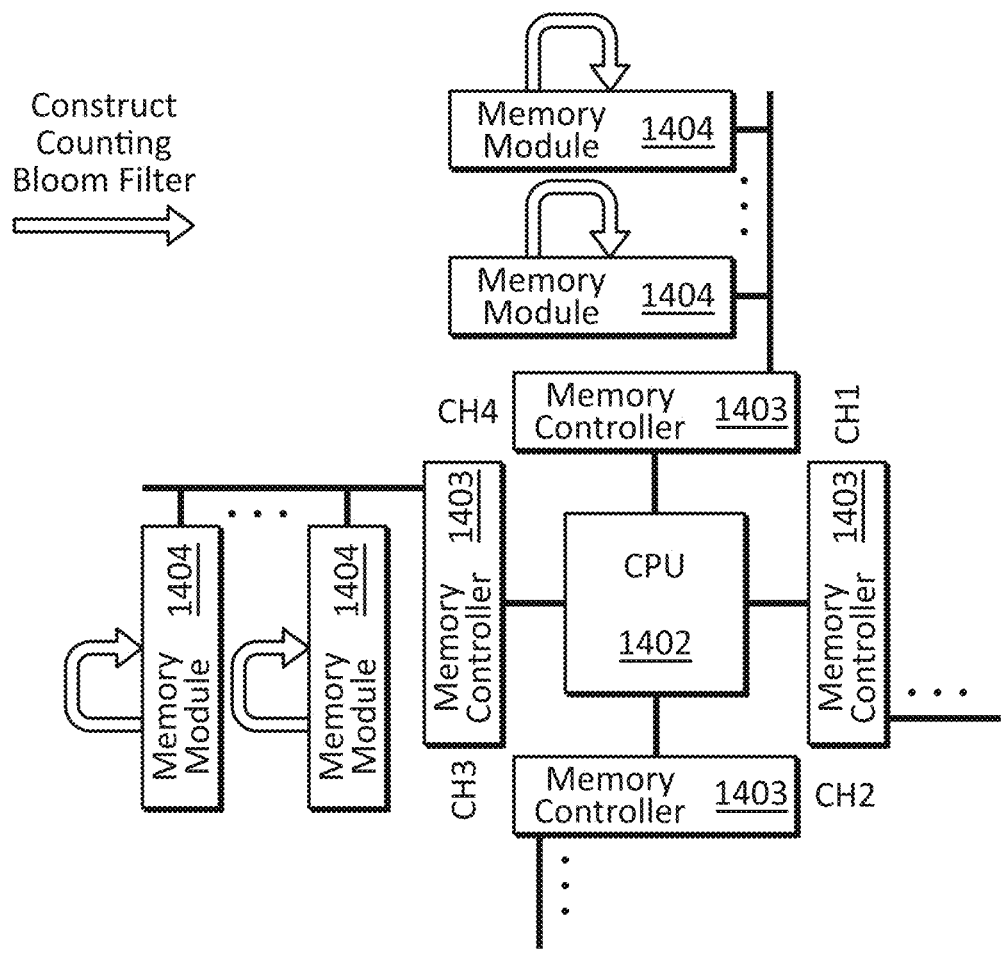
FIG. 14A illustrates an embodiment of a counting Bloom filter construction operation in accordance with example embodiments of the disclosure.
Figure 14B:
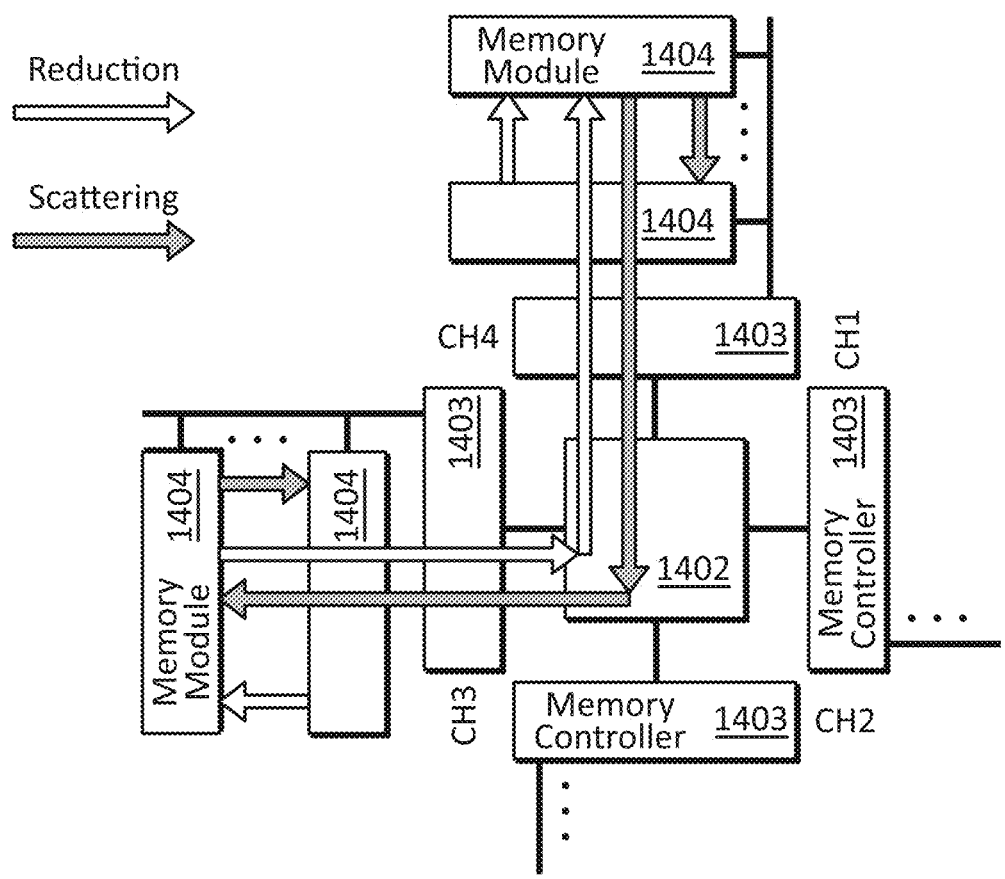
FIG. 14B illustrates an embodiment of a merge operation in accordance with example embodiments of the disclosure.
Figure 14C:
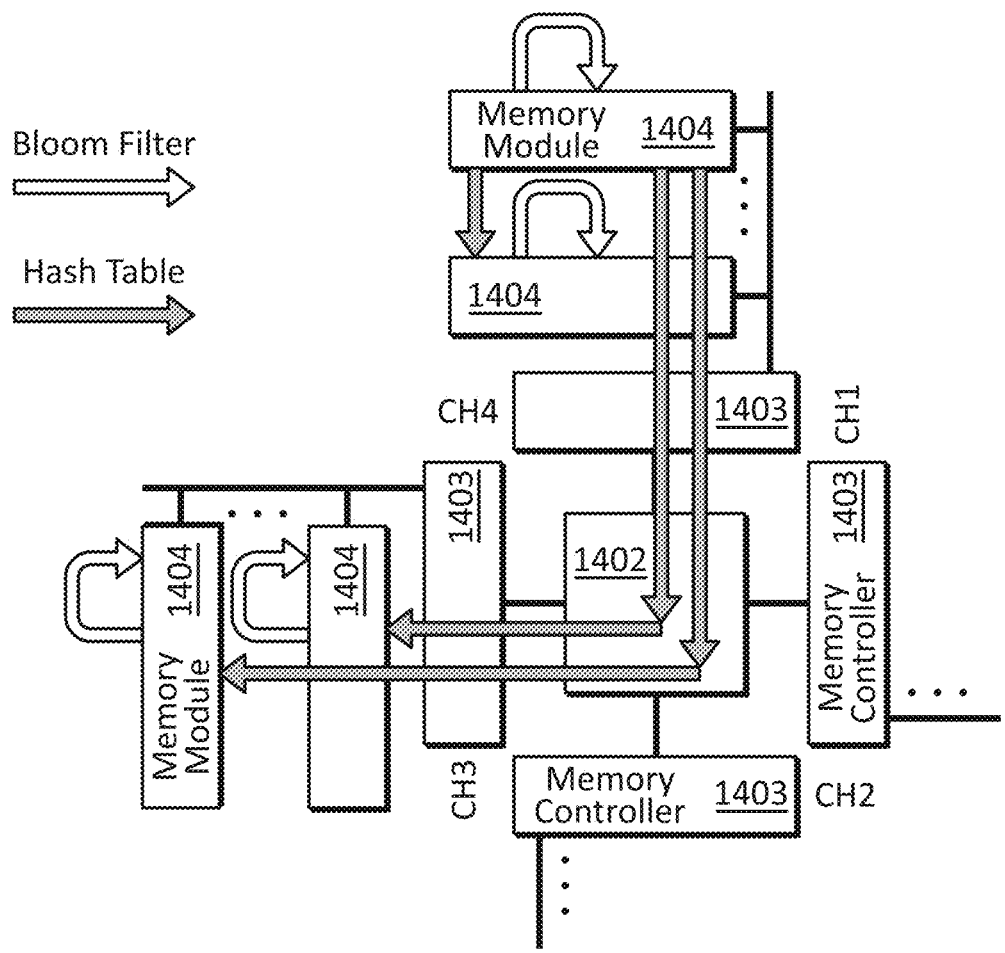
FIG. 14C illustrates an embodiment of a count operation in accordance with example embodiments of the disclosure.

FIGS. 14A through 14C illustrate an example embodiment of a k-mer counting workflow using a counting Bloom filter in accordance with example embodiments of the disclosure, FIG. 14A illustrates an embodiment of a counting Bloom filter construction operation in accordance with example embodiments of the disclosure. FIG. 14B illustrates an embodiment of a merge operation in accordance with example embodiments of the disclosure. FIG. 14C illustrates an embodiment of a count operation in accordance with example embodiments of the disclosure. The embodiments illustrated in FIGS. 14A through 14C may each include a host CPU 1402, one or more memory controllers 1403, and one or more memory modules 1404. For purposes of illustration, the embodiment illustrated in FIGS. 14A through 14C may be described in the context of the system illustrated in FIG. 7, but the workflow may be used with any suitable system.

As with the embodiment illustrated in FIGS. 11A through 11C, to enable parallel processing in a k-mer counting workflow in the embodiment illustrated in FIGS. 14A through 14C, an input dataset, which may include, for example, a DNA sequence, may be evenly partitioned into portions that may be distributed to different memory modules 1404, which in this example may be implemented as DIMMs. During a counting Bloom filter construction operation as illustrated in FIG. 14A, each memory module 1404 may construct a local counting Bloom filter independently as shown by the arrows. During this operation, each memory module may read a local portion of the dataset and use the data to construct the local counting Bloom filter which may also be stored locally. During this operation, inter-module communication may be reduced or eliminated by the use of task partitioning and/or localization of data.

After completing the counting Bloom filter construction, the local counting Bloom filters may be reduced and scattered during a merge operation which may synchronize the counting Bloom filters in the different memory modules 1404, as illustrated in FIG. 14B. In some embodiments, counting Bloom filters may be reduced by adding the corresponding entries (e.g., counters) of counting Bloom filters as shown by the unshaded arrows. After the entries have been added, if a counter entry in the reduced Bloom filter is larger than two, the corresponding entry in the merged Bloom filter may be set to one, otherwise it may be set to zero. In some embodiments, the merged counting Bloom filter may be scattered by distributing the merged Bloom filter to each memory module 1404 as shown by the shaded arrows. In some embodiments, the reduction and/or scatter operations may only involve sequential read and/or write operations for data transfers.

After scattering the merged Bloom filters, each memory module 1404 may contain a copy of the merged Bloom filter. Then a k-mer counting operation may be performed in parallel at the memory modules 1404. During the k-mer counting operation, for each k-mer, the memory module may first check the second Bloom filter as shown by the unshaded arrows to determine if the current k-mer is non-unique. If the current k-mer is non-unique, the entry corresponding to the current k-mer in the hash table, which may be distributed among different memory modules 1404, may be accessed as shown by the shaded arrows and incremented by one. In some embodiments, this operation may reduce or eliminate inter-module communication, for example, because inter-module communication may only be used for verified non-unique k-mers.

Thus, in the embodiment illustrated in FIGS. 14A through 14C, depending on the implementation details, processing for k-mer counting may be performed in parallel by memory modules 1404. Moreover, local construction of counting Bloom filters may improve system performance because it may involve little or no inter-module communication. The reduction and scattering of the counting Bloom filters may only involve continuous sequential read and/or write operations which may have little or no impact on performance. Additionally, unnecessary inter-module memory access may be avoided during the k-mer counting operation by checking the merged Bloom filter which may be stored locally.

In some embodiments, and depending on the implementation details, systems, methods and/or devices in accordance with example embodiments of the disclosure may reduce or prevent communication bottlenecks by implementing a workflow that may reduce or eliminate unnecessary inter-module memory access, for example, by dividing an input dataset for k-mer counting into multiple partitions and localizing the partitions, and/or operations on the partitions, in multiple memory modules, which may operate with a large degree of parallelism. In some embodiments, and depending on the implementation details, systems, methods and/or devices in accordance with example embodiments of the disclosure may reduce or prevent communication bottlenecks by implementing a hierarchical bus that may include an inter-rank C/A bus and/or an inter-rank data bus, thereby reducing or minimizing inter-module communications.

Bandwidth Utilization

FIG. 15A illustrates an embodiment of an address mapping for memory devices in accordance with example embodiments of the disclosure. The mapping illustrated in FIG. 15A may begin with a 2-bit channel address at the most significant bit (MSB) location followed by a 4-bit rank address, a 4-bit device address, 4-bank bank address, 16-bit row address, 10-bit column address, a 3-bit burst address, and a 2-bit width at the least significant bit (LSB) location. The mapping illustrated in FIG. 15A may coalesce data within memory devices, which, in some embodiments, may take advantage of data locality. However, applications such as k-mer counting may involve large numbers of fine-grained (e.g., 1-bit or 2-bit) random memory access which may have little or no locality. Thus, depending on the implementation details, memory bandwidth may be under-utilized.

Some embodiments in accordance with example embodiments of the disclosure may implement a distributed data mapping scheme to distribute data across memory devices, ranks, memory modules, and/or the like.

FIG. 15B illustrates another embodiment of an address mapping for memory devices in accordance with example embodiments of the disclosure. The mapping illustrated in FIG. 15B may begin with a 2-bit channel address at the MSB location followed by a 16-bit row address, a 4-bit bank address, a 4-bit rank address, a 4-bit device address, a 10-bit column address, a 3-bit burst address, and a 2-bit width at the LSB location. The mapping illustrated in FIG. 15B may re-order the address bits for a memory device to prioritize distributing data in different memory devices (e.g., DRAM chips). Depending on the implementation details, this may improve memory bandwidth utilization, for example, by reducing or eliminating the concentration of data within memory devices, ranks, memory modules, and/or the like.

Workload Balance

In some embodiments, a workload monitor such as workload monitor 938 illustrated in FIG. 9 may implement a task scheduling scheme based on monitoring the workload of one or more compute resources. For example, a task scheduling scheme may balance the workload between processing elements 932 in near-memory computing module 924.

In some embodiments, a task scheduling scheme may utilize the input buffer 942 as an incoming task queue. The workload monitor 938 may monitor the states of the one or more processing elements 932 and the input buffer 942. If one of the processing elements 932 completes a task, the workload monitor 938 may select a unit of input data from the input buffer 942 and dispatch it as a task to the processing element 932 to keep it busy. Thus, in some embodiments, the workload monitor 938 may implement a task scheduling scheme by dynamically dispatching tasks to processing elements 932 with fine granularity. Depending on the implementation details, this may improve the utilization of one or more compute resources.

Redundant Memory Access

Figure 16A:
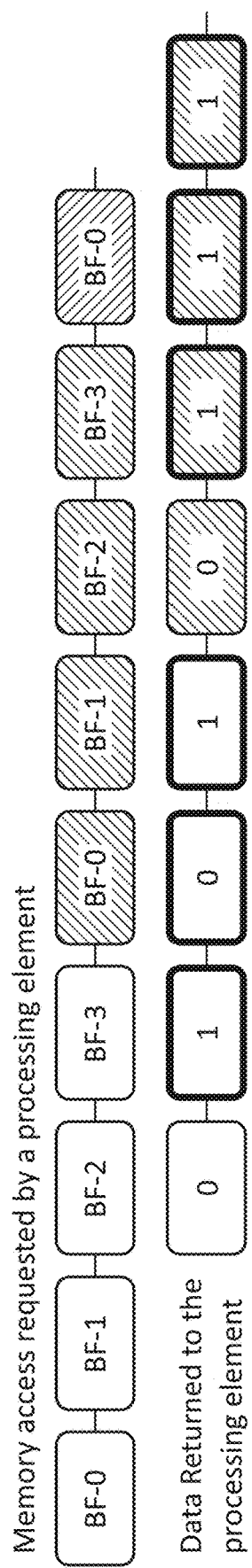
FIG. 16A illustrates an example embodiment of a sequential memory access method for a Bloom filter in accordance with example embodiments of the disclosure.

FIG. 16A illustrates an example embodiment of a first memory access method for a Bloom filter in accordance with example embodiments of the disclosure. The embodiment illustrated in FIG. 16A may use four hash functions (n=4). Thus, four Bloom filter entries may be checked for each k-mer. During a k-mer counting operation, all Bloom filter entries related to current k-mer in the merged Bloom filter may be checked to verify that they are ones. If all of the corresponding Bloom filter entries are ones, the hash table may be updated. Otherwise, no write operation may be performed. However, in some embodiments, sequential memory accesses of the merged Bloom filter may result in wasted memory bandwidth as described below.

In the embodiment illustrated in FIG. 16A, memory accesses of the merged Bloom filter may be issued sequentially for each task (which may be performed by a different processing element for each k-mer). The top sequence in FIG. 16A illustrates a sequence of Bloom filter accesses in which requests for the same task (k-mer and processing element) are indicated with the same type of shading. The bottom sequence in FIG. 16A illustrates the data returned to the processing element for each read request in which returned data for a specific task are indicated with the same type of shading as the task. Thus, four memory accesses for each k-mer may be issued sequentially, and the data may also be returned sequentially.

The first Bloom filter entry returned for the first task (indicated with no shading) may be a zero. However, if the first entry is a zero, the next three entries (indicated by heavy outlining) may be irrelevant (e.g., "don't care" terms). Thus, the next three accesses may be unnecessary and may waste memory bandwidth.

Some embodiments may implement a scattered memory access and/or task-switching scheme. For example, memory accesses for one task may be interleaved with memory accesses for one or more other tasks. Depending on the implementation details, this may reduce or eliminate unusable data accesses. Additionally, or alternatively, tasks may be switched between memory accesses, for example, to fill memory access time slots with accesses of usable data. Depending on the implementation details, this may improve memory bandwidth utilization.

Figure 16B:
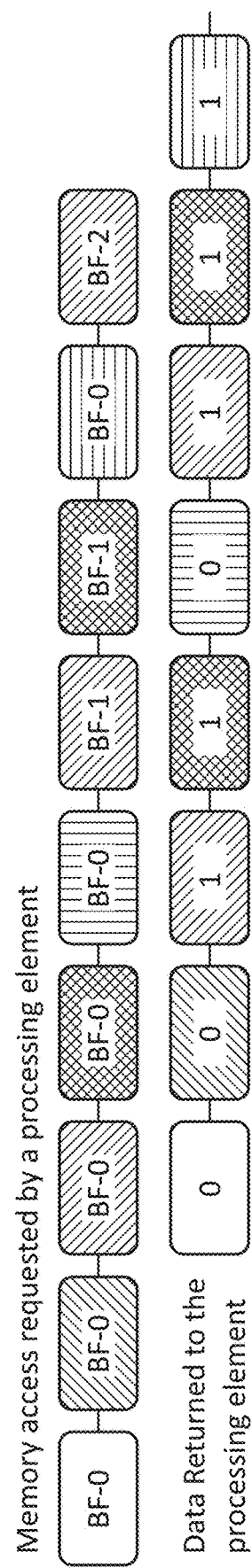
FIG. 16B illustrates an example embodiment of a scattered memory access method for a Bloom filter in accordance with example embodiments of the disclosure.

FIG. 16B illustrates an example embodiment of a second memory access method for a Bloom filter in accordance with example embodiments of the disclosure. In the embodiment illustrated in FIG. 16B, memory accesses for different tasks (k-mers and Bloom filters) may be scattered and/or issued with time intervals. For example, a subsequent memory access for a specific task may only be issued if all previous accesses returned ones. Thus, as shown in FIG. 16B, no subsequent memory accesses may be issued after the first accesses for the first two tasks because the first access for each of the first two tasks returned zeros. However, because the first memory access for the third task may return a one, a second memory access (BF-1) for the third task may be issued after a time interval. In some embodiments, and depending on the implementation details, this may reduce or eliminate redundant memory accesses and/or utilize available memory bandwidth more efficiently.

Although redundant memory accesses may be reduced or eliminated with scattered memory accesses, in some embodiments, memory bandwidth may still be wasted, for example, due to a lack of memory accesses to fill the time intervals between memory accesses for a task, Thus, some embodiments may switch tasks between memory accesses as shown in FIG. 16B. For example, after issuing a memory access for a first task for a first k-mer, a processing element may switch to a second task belonging to a second k-mer while waiting for the return data for the first task. Thus, time intervals caused between scattered memory accesses may be filled with memory accesses belonging to different tasks and/or processing elements. In some embodiments, and depending on the implementation details, this may further improve memory bandwidth utilization. In some embodiments, the combination of scattered memory accesses and task switching may produce a synergistic effect that may reduce or eliminate redundant memory accesses and/or utilize memory bandwidth efficiently.

Figure 17:
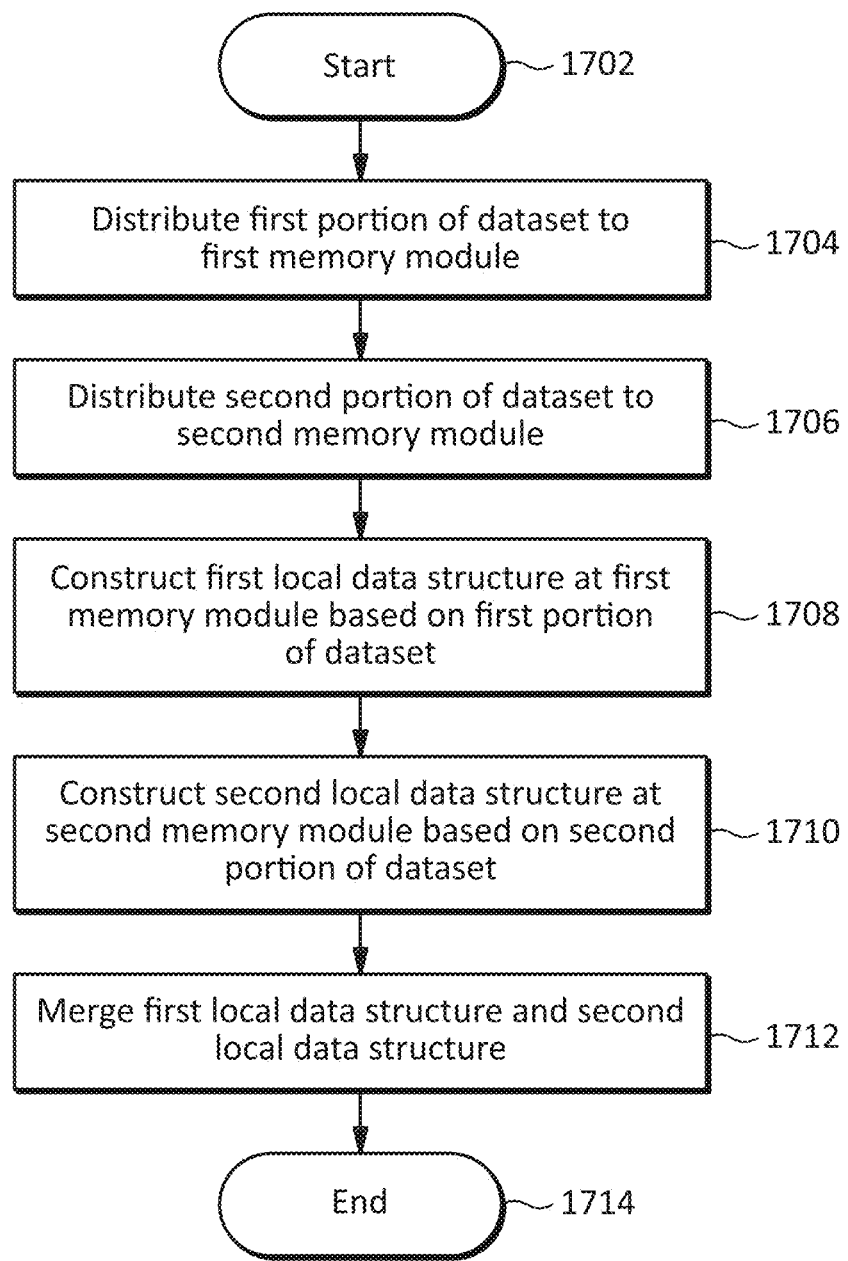
FIG. 17 illustrates an embodiment of a method of processing a dataset in accordance with example embodiments of the disclosure.

FIG. 17 illustrates an embodiment of a method of processing a dataset in accordance with example embodiments of the disclosure. The embodiment illustrated in FIG. 17 may begin at operation 1702. At operation 1704, the method may distribute a first portion of a dataset to a first memory module. At operation 1706, the method may distribute a second portion of the dataset to a second memory module. At operation 1708, the method may construct a first local data structure at the first memory module based on the first portion of the dataset. At operation 1710, the method may construct a second local data structure at the second memory module based on the second portion of the dataset. At operation 1712, the method may merge the first local data structure and the second local data structure. The method may end at operation 1714.

The embodiments illustrated in FIG. 17, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," "access" may refer to "access at least in part." and/or the like. A reference to a first element may not imply the existence of a second element. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. An apparatus comprising:
   a memory module comprising:
      a first rank of one or more first memory devices;
      a near-memory computing circuit coupled to one of the one or more first memory devices, the near-memory computing circuit comprising:
         a first processing element configured to process data from the one or more first memory devices; and
         a first memory controller configured to coordinate access of the one or more first memory devices by a host and the first processing element;
      a second rank of one or more second memory devices;
      a bus structure configured to transfer data between the first rank and the second rank; and
   wherein the memory module is configured to:
   send a first portion of a dataset to the one or more first memory devices, wherein the one or more first memory devices are coupled to the first processing element and a first connector to transfer the first portion of the dataset;
   send a second portion of the dataset to the one or more second memory devices, wherein the one or more second memory devices are coupled to a second processing element and a second connector to transfer the second portion of the dataset;
   construct, using the first processing element, a first data structure at the one or more first memory devices based on the first portion of the dataset;
   construct, using the second processing element, a second data structure at the one or more second memory devices based on the second portion of the dataset;
   merge the first data structure and the second data structure to generate a merged data structure;
   send at least a first portion of the merged data structure to the one or more first memory devices; and
   send a second portion of the merged data structure to the one or more second memory devices.

2. The apparatus of claim 1, wherein the first processing element is configured to process data from the one or more first memory devices by performing a counting operation on the data.

3. The apparatus of claim 1, wherein:
   the near-memory computing circuit comprises a first near-memory computing circuit; and
   the second rank comprises:
      one or more second memory devices; and
      a second near-memory computing circuit coupled to the one or more second memory devices, the second near-memory computing circuit comprising:
         the second processing element configured to process data from the one or more second memory devices; and
         a second memory controller configured to coordinate access of the one or more second memory devices from a host and the second processing element.

4. The apparatus of claim 1, wherein the near-memory computing circuit further comprises a workload monitor configured to modify a first workload of a first one of the one or more processing elements based on a second workload of a second one of the one or more processing elements.

5. The apparatus of claim 1, wherein the signal comprises a control signal or an address signal.

6. The apparatus of claim 1, wherein the signal comprises a data signal.

7. A method comprising:
   sending a first portion of a dataset to a first memory module comprising a first processing element and a first connector to transfer the first portion of the dataset;
   sending a second portion of the dataset to a second memory module comprising a second processing element and a second connector to transfer the second portion of the dataset;
   constructing, using the first processing element, a first data structure at the first memory module based on the first portion of the dataset;
   constructing, using the second processing element, a second data structure at the second memory module based on the second portion of the dataset;
   merging the first data structure and the second data structure to generate a merged data structure;
   sending at least a first portion of the merged data structure to the first memory module; and
   sending a second portion of the merged data structure to the second memory module.

8. The method of claim 7, wherein:
   the method further comprises performing a counting operation on the merged data structure at the first memory module and the second memory module.

9. The method of claim 7, wherein:
   the merging the first data structure and the second data structure comprises reducing the first data structure and the second data structure.

10. The method of claim 9, further comprising sending the first portion of the dataset to two or more ranks at the first memory module.

11. The method of claim 7, further comprising modifying a first workload of the first processing element based on a second workload of the second processing element.

12. The method of claim 7, further comprising:
   accessing first data of the first data structure;
   performing, using the first data, a task;
   determining a result of the task; and
   accessing, based on the result of the task, second data of the first data structure.

13. The method of claim 7, further comprising:
performing a first task based on a first memory access of the first portion of the dataset; and
performing a second task based on a second memory access of the first portion of the dataset.

14. The method of claim 7, wherein the merged data structure is a first merged data structure and the portion of the merged data structure is a first portion of the merged data structure, the method further comprising:
sending a second portion of the first merged data structure to the second memory module;
constructing a third data structure at the first memory module based on the first merged data structure;
constructing a fourth data structure at the first memory module based on the first merged data structure;
merging the third data structure and the fourth data structure to form a second merged data structure; and
performing a counting operation on the second merged data structure at the first memory module and the second memory module.

15. The method of claim 7, wherein:
the dataset comprises a genetic sequence;
the first data structure comprises a Bloom filter; and
the Bloom filter comprises one or more k mers of the genetic sequence.

16. The method of claim 7, wherein the first memory module comprises a first memory device and a second memory device, the method further comprising sending the first portion of the dataset to the first memory device and the second memory device based on a location of device information in an address for the first portion of the dataset.

17. The method of claim 7, wherein:
the first data structure comprises a first counting filter; and
the second data structure comprises a second counting filter.

18. A system comprising:
a first memory module configured to construct a first local data structure based on a first portion of a dataset, the first memory module comprising a first connector to transfer the first portion of the dataset;
a second memory module configured to construct a second local data structure based on a second portion of the dataset, the second memory module comprising a second connector to transfer the second portion of the dataset; and
a host coupled to the first memory module and the second memory module using one or more memory channels, wherein the host is configured to:
send the first portion of the dataset to the first memory module;
send the second portion of the dataset to the second memory module;
merge the first local data structure and the second local data structure to generate a merged data structure;
send a first portion of the merged data structure to the first memory module; and
send a second portion of the merged data structure to the second memory module.

19. The system of claim 18, wherein the first memory module is configured to perform a counting operation on the first portion of the merged data structure.

* * * * *